United States Patent
Satou et al.

(10) Patent No.: US 7,569,247 B2
(45) Date of Patent: Aug. 4, 2009

(54) CONDUCTIVE PASTE FOR AN ELECTRODE LAYER OF A MULTI-LAYERED CERAMIC ELECTRONIC COMPONENT AND A METHOD FOR MANUFACTURING A MULTI-LAYERED UNIT FOR A MULTI-LAYERED CERAMIC ELECTRONIC COMPONENT

(75) Inventors: Shigeki Satou, Tokyo (JP); Takeshi Nomura, Tokyo (JP)

(73) Assignee: TDK Corporation, Tokyo (JP)

( * ) Notice: Subject to any disclaimer, the term of this patent is extended or adjusted under 35 U.S.C. 154(b) by 184 days.

(21) Appl. No.: 10/580,749

(22) PCT Filed: Nov. 24, 2004

(86) PCT No.: PCT/JP2004/017396

§ 371 (c)(1),
(2), (4) Date: May 26, 2006

(87) PCT Pub. No.: WO2005/052954

PCT Pub. Date: Jun. 9, 2005

(65) Prior Publication Data

US 2007/0096061 A1    May 3, 2007

(30) Foreign Application Priority Data

Nov. 27, 2003   (JP)   ............... 2003-396989

(51) Int. Cl.
*B05D 5/00* (2006.01)
(52) U.S. Cl. ..................................... 427/58
(58) Field of Classification Search .............. 427/58
See application file for complete search history.

(56) References Cited

U.S. PATENT DOCUMENTS

| | | | |
|---|---|---|---|
| 4,415,703 A | 11/1983 | Toba et al. | |
| 5,179,773 A | 1/1993 | Monsees et al. | |
| 5,412,865 A | 5/1995 | Takaoka et al. | |
| 5,480,503 A | 1/1996 | Casey et al. | |
| 5,716,481 A | 2/1998 | Kobayashi et al. | |
| 5,808,856 A | 9/1998 | Bischoff et al. | |
| 5,840,107 A | 11/1998 | Salibay | |
| 5,935,358 A | 8/1999 | Yamasaki | |
| 5,985,065 A | 11/1999 | Kling | |
| 5,985,068 A | 11/1999 | Kawakami et al. | |
| 6,212,064 B1 * | 4/2001 | Aoki et al. | 361/523 |
| 6,245,171 B1 | 6/2001 | Natarajan et al. | |
| 6,563,690 B2 * | 5/2003 | Kishi et al. | 361/312 |
| 6,607,690 B2 | 8/2003 | Anahara et al. | |
| 6,773,533 B2 | 8/2004 | Hanai | |
| 6,808,577 B2 | 10/2004 | Miyazaki et al. | |
| 7,001,539 B2 | 2/2006 | Oda et al. | |
| 7,318,874 B2 | 1/2008 | Roosen et al. | |
| 2002/0075632 A1 * | 6/2002 | Nakano et al. | 361/320 |
| 2003/0096056 A1 | 5/2003 | Kawamura et al. | |
| 2003/0138635 A1 * | 7/2003 | Haruta et al. | 428/413 |
| 2006/0096693 A1 | 5/2006 | Murosawa et al. | |
| 2006/0196592 A1 | 9/2006 | Karatsu et al. | |
| 2006/0199883 A1 * | 9/2006 | Banba et al. | 524/140 |
| 2006/0254701 A1 | 11/2006 | Murosawa et al. | |
| 2007/0017091 A1 | 1/2007 | Karatsu et al. | |
| 2007/0034841 A1 | 2/2007 | Satou et al. | |
| 2008/0053593 A1 | 3/2008 | Sato | |

FOREIGN PATENT DOCUMENTS

| | | |
|---|---|---|
| CN | 1303104 A | 7/2001 |
| JP | 57204866 A | 12/1982 |
| JP | 3096207 A | 4/1991 |
| JP | 3276710 A | 12/1991 |
| JP | 4280614 A | 10/1992 |
| JP | 4282812 A | 10/1992 |
| JP | 5062860 A | 3/1993 |
| JP | 05-325633 | 12/1993 |
| JP | 06053654 A | 2/1994 |
| JP | 6072760 A | 3/1994 |
| JP | 06085466 A | 3/1994 |
| JP | 6206756 A | 7/1994 |
| JP | 06224556 A | 8/1994 |
| JP | 07-021832 | 1/1995 |
| JP | 07-021833 | 1/1995 |

(Continued)

OTHER PUBLICATIONS

"RotoMill—Colloid Mills," GlobalSpec, 1999, 2 pages.
Chinese Office Action relating to Chinese Patent Application No. 200480028461.4, issued Jan. 9, 2009, 2 pages.

*Primary Examiner*—Michael Cleveland
*Assistant Examiner*—Tabassom Tadayyon Eslami
(74) *Attorney, Agent, or Firm*—Seed IP Law Group PLLC

(57) ABSTRACT

It is an object of the present invention to provide a method for manufacturing a multilayered unit for a multi-layered ceramic electronic component which can reliably prevent short circuit failure from occurring 5 in a multi-layered ceramic electronic component. According to the present invention, a multi-layered unit for a multi-layered ceramic electronic component is fabricated by printing a conductive paste containing a butyral system resin as a binder and at least one solvent selected from a group consisting of dihydroterpinyl oxyethanol, terpinyl oxyethanol, d-dihydrocarveol, I-citronellol, I-perillylalcohol and acetoxy-methoxyethoxy-cyclohexanol acetate as a solvent on a ceramic green sheet containing an acrylic system resin as a binder in a predetermined pattern, thereby forming an electrode layer.

18 Claims, No Drawings

FOREIGN PATENT DOCUMENTS

| | | | |
|---|---|---|---|
| JP | 7312328 A | 11/1995 |
| JP | 08-111346 | 4/1996 |
| JP | 8130152 A | 5/1996 |
| JP | 08111346 * | 6/1996 |
| JP | 08279438 A | 10/1996 |
| JP | 09124771 * | 5/1997 |
| JP | 10-275734 | 10/1998 |
| JP | 11053939 A | 2/1999 |
| JP | 11238646 A | 8/1999 |
| JP | 11273987 A | 10/1999 |
| JP | 2000315618 A | 11/2000 |
| JP | 2000331865 A | 11/2000 |
| JP | 2001023853 A | 1/2001 |
| JP | 2001044065 A | 2/2001 |
| JP | 2001135138 A | 5/2001 |
| JP | 2001162737 A | 6/2001 |
| JP | 2001172594 A | 6/2001 |
| JP | 2001237140 A | 8/2001 |
| JP | 2002043164 A | 2/2002 |
| JP | 3306814 B2 | 7/2002 |
| JP | 2002270456 A | 9/2002 |
| JP | 2002313672 A | 10/2002 |
| JP | 2002343674 A | 11/2002 |
| JP | 2003-017356 | 1/2003 |
| JP | 2003059759 A | 2/2003 |
| JP | 2003-164992 | 6/2003 |
| JP | 2003249121 A | 9/2003 |

* cited by examiner

CONDUCTIVE PASTE FOR AN ELECTRODE LAYER OF A MULTI-LAYERED CERAMIC ELECTRONIC COMPONENT AND A METHOD FOR MANUFACTURING A MULTI-LAYERED UNIT FOR A MULTI-LAYERED CERAMIC ELECTRONIC COMPONENT

FIELD OF THE INVENTION

The present invention relates to a conductive paste for an electrode layer of a multi-layered ceramic electronic component and a method for manufacturing a multi-layered unit for a multi-layered ceramic electronic component, and particularly to a conductive paste for an electrode layer which does not dissolve a binder contained in a layer adjacent to the electrode layer of the multi-layered ceramic electronic component and can reliably prevent short circuit failure from occurring in a multi-layered ceramic electronic component and a method for manufacturing a multi-layered unit for a multi-layered ceramic electronic component which can reliably prevent short circuit failure from occurring in a multi-layered ceramic electronic component.

BACKGROUND OF THR INVENTION

Recently, the need to downsize various electronic devices makes it necessary to downsize the electronic components incorporated in the devices and improve the performance thereof. Also in multi-layered ceramic electronic components, such as multi-layered ceramic capacitors, it is strongly required to increase the number of layers and make the laminated unit thinner.

When a multi-layered ceramic electronic component as typified by a multi-layered ceramic capacitor is to be manufactured, ceramic powders, a binder such as an acrylic system resin, a butyral resin or the like, a plasticizing agent such as a phthalate ester, glycol, adipate ester, phosphate ester or the like, and an organic solvent such as toluene, methyl ethyl ketone, acetone or the like are mixed and dispersed, thereby preparing a dielectric paste for a ceramic green sheet.

The dielectric paste is then applied onto a support sheet made of polyethylene terephthalate (PET), polypropylene (PP) or the like using an extrusion coater, a gravure coater or the like to form a coating layer and the coating layer is heated to dryness, thereby fabricating a ceramic green sheet.

Further, a conductive powder of nickel or the like and a binder are dissolved into a solvent such as terpineol, thereby preparing a conductive paste and the thus prepared conductive paste is printed on the ceramic green sheet in a predetermined pattern using a screen printing machine and dried, thereby forming an electrode layer.

When the electrode layer has been formed, the ceramic green sheet on which the electrode layer is formed is peeled off from the support sheet to form a multi-layered unit including the ceramic green sheet and the electrode layer. Then, a ceramic green chip is formed by laminating a desired number of the multi-layered units to form the laminated body, pressing the laminated body and dicing the laminated body.

Finally, the binder is removed from the green chip, the green chip is baked and an external electrode is formed, thereby completing a multi-layered ceramic electronic component such as a multi-layered ceramic capacitor.

At present, the need to downsize electronic components and improve the performance thereof makes it necessary to set the thickness of the ceramic green sheet determining the spacing between layers of a multi-layered ceramic capacitor to be equal to or smaller than 3 µm or 2 µm and to laminate three hundred or more multi-layered units each including a ceramic green sheet and an electrode layer.

DISCLOSURE OF THE INVENTION

Problems to be Solved by the Invention

However, in the case where an electrode layer is formed by printing a conductive paste prepared using terpineol, which is highly popular as a solvent for a conductive paste, on a ceramic green sheet formed using a butyral resin, which is the most popular binder for a ceramic green sheet, the binder contained in the ceramic green sheet is dissolved by terpineol contained in the conductive paste and pinholes and cracks are generated in the ceramic green sheet, thereby causing short circuit failure.

One proposed solution for these problems is to employ a hydrocarbon system solvent such as kerosene, decane or the like as the solvent for the conductive paste. However, since a hydrocarbon system solvent such as kerosene, decane or the like does not dissolve the binder component used for the conductive paste, it is impossible to completely replace the conventional solvent such as terpineol with a hydrocarbon system solvent such as kerosene, decane or the like. Therefore, since the butyral resin contained in the ceramic green sheet as a binder is still soluble in the solvent contained in the conductive paste to some extent, it is difficult to prevent generation of pinholes and cracks in the ceramic green sheet in the case where the ceramic green sheet is very thin, and since the viscosity of a hydrocarbon system solvent such as kerosene, decane or the like is lower than that of terpineol, it is difficult to control the viscosity of the conductive paste.

Further, Japanese Patent Application Laid Open No. 5-325633, Japanese Patent Application Laid Open No. 7-21833 and Japanese Patent Application Laid Open No. 7-21832 propose a conductive paste prepared using a hydrogenated terpineol such as dihydroterpineol or a terpene system solvent such as dihydroterpineol acetate instead of terpineol as a solvent. However, since the butyral resin contained in the ceramic green sheet as a binder is also soluble in a hydrogenated terpineol such as dihydroterpineol or a terpene system solvent such as dihydroterpineol acetate to some extent, it is difficult to prevent generation of pinholes and cracks in a ceramic green sheet in the case where the ceramic green sheet is very thin.

It is therefore an object of the present invention to provide a conductive paste for an electrode layer of a multi-layered ceramic electronic component which does not dissolve a binder contained in a layer adjacent to the electrode layer in the multi-layered ceramic electronic component and can reliably prevent short circuit failure from occurring in a multi-layered ceramic electronic component.

Another object of the present invention is to provide a method for manufacturing a multi-layered unit for a multi-layered ceramic electronic component which can reliably prevent short circuit failure from occurring in a multi-layered ceramic electronic component.

Means for Solving the Problem

The inventors of the present invention vigorously pursued a study for accomplishing the above objects and, as a result, made the discovery that in the case where a conductive paste was prepared using a butyral system resin as a binder and at least one solvent selected from a group consisting of dihydroterpinyl oxyethanol, terpinyl oxyethanol, d-dihydrocarveol, I-citronellol, I-perillylalcohol and acetoxy-methoxyethoxy-cyclohexanol acetate as a solvent, it was possible to dissolve the binder in the solvent in a desired manner and even when the conductive paste was printed on a ceramic green sheet containing an acrylic system resin as a binder, thereby forming an electrode layer, the binder contained in the ceramic green sheet was not dissolved in the solvent contained in the conductive paste and it was therefore possible to reliably prevent generation of pinholes and cracks in the ceramic green sheet even in the case where the ceramic green sheet was very thin.

The present invention is based on these findings and therefore, the objects of the present invention can be accomplished by a conductive paste containing a butyral system resin as a binder and at least one solvent selected from a group consisting of dihydroterpinyl oxyethanol, terpinyl oxyethanol, d-dihydrocarveol, I-citronellol, I-perillylalcohol and acetoxy-methoxyethoxy-cyclohexanol acetate as a solvent.

The above objects of the present invention can be also accomplished by a method for manufacturing a multi-layered unit for a multi-layered ceramic electronic component comprising a step of printing a conductive paste containing a butyral system resin as a binder and at least one solvent selected from a group consisting of dihydroterpinyl oxyethanol, terpinyl oxyethanol, d-dihydrocarveol, I-citronellol, I-perillylalcohol and acetoxy-methoxyethoxy-cyclohexanol acetate as a solvent on a ceramic green sheet containing an acrylic system resin as a binder in a predetermined pattern to form an electrode layer.

According to the present invention, even in the case where an electrode layer is formed by printing a conductive paste on a very thin ceramic green sheet containing an acrylic system resin as a binder, it is possible to effectively prevent the binder contained in the ceramic green sheet from being dissolved in the solvent contained in the conductive paste. Therefore, even in the case where the ceramic green sheet is very thin, it is possible to reliably prevent generation of pinholes and cracks in the ceramic green sheet.

In a preferred aspect of the present invention, prior to forming the electrode layer or after forming and drying the electrode layer, a dielectric paste containing a butyral system resin as a binder and at least one solvent selected from a group consisting of dihydroterpinyl oxyethanol, terpinyl oxyethanol, d-dihydrocarveol, I-citronellol, I-perillylalcohol and acetoxy-methoxyethoxy-cyclohexanol acetate as a solvent is printed on a ceramic green sheet in a complementary pattern to that of the electrode layer, thereby forming a spacer layer.

According to this preferred aspect of the present invention, since a spacer layer is formed on a ceramic green sheet in a complementary pattern to that of the electrode layer, it is possible to prevent a step from being formed between the surface of the electrode layer and the surface of the ceramic green sheet where no electrode layer is formed. Therefore, even in the case of laminating a number of multi-layered units each including a ceramic green sheet and an electrode layer and fabricating a multi-layered electronic component such as a multi-layered ceramic capacitor, it is possible to effectively prevent the thus fabricated multi-layered electronic component from being deformed and also effectively prevent delamination of layers from occurring.

Further, an acrylic system resin contained in the ceramic green sheet as a binder is soluble in a combined solvent of terpineol and kerosene, dihydroterpineol, terpineol and the like conventionally used as a solvent to be included in a conductive paste for forming an electrode layer and a dielectric paste for forming a spacer layer. Therefore, in the case where any of these solvents is used as a solvent for a dielectric paste for forming a spacer layer, the solvent contained in the dielectric paste for forming the spacer layer seeps into the ceramic green sheet to dissolve or swell the ceramic green sheet, thereby generating fissures or wrinkles on the surface of the spacer layer. As a result, in the case of laminating a number of multi-layered units each including a ceramic green sheet and an electrode layer and fabricating a multi-layered electronic component such as a multi-layered ceramic capacitor, voids tend to be generated in the multi-layered electronic component. However, according to this preferred aspect of the present invention, the dielectric paste for forming a spacer layer contains a butyral system resin as a binder and at least one solvent selected from a group consisting of dihydroterpinyl oxyethanol, terpinyl oxyethanol, d-dihydrocarveol, I-citronellol, I-perillylalcohol and acetoxy-methoxyethoxy-cyclohexanol acetate as a solvent and a solvent selected from a group consisting of dihydroterpinyl oxyethanol, terpinyl oxyethanol, d-dihydrocarveol, I-citronellol, I-perillylalcohol and acetoxy-methoxyethoxy-cyclohexanol acetate hardly dissolves an acrylic system resin contained in a ceramic green sheet as a binder. As a result, it is possible to reliably prevent the ceramic green sheet from being dissolved or swelled and fissures or wrinkles from being generated on the surface of the spacer layer. Therefore, in the case of laminating a number of multi-layered units each including a ceramic green sheet and an electrode layer and fabricating a multi-layered electronic component such as a multi-layered ceramic capacitor, it is possible to reliably prevent generation of voids in the multi-layered electronic component.

In the present invention, it is preferable for the degree of polymerization of a butyral system resin contained as a binder in the conductive paste for forming an electrode layer and that of a butyral system resin contained as a binder in the dielectric paste for forming a spacer layer to be equal to or larger than 1400 and equal to or smaller than 2600. In the case where a butyral system resin whose degree of polymerization is equal to or larger than 1400 and equal to or smaller than 2600 is employed as the binder of a conductive paste for forming an electrode layer and butyral system resin whose degree of polymerization is equal to or larger than 1400 and equal to or smaller than 2600 is employed as the binder of a dielectric paste for forming a spacer layer, it is possible to prepare a conductive paste for forming an electrode layer so as to have a desired viscosity and prepare a dielectric paste for forming a spacer layer so as to have a desired viscosity.

In the present invention, it is preferable for the degree of butyralization of butyral system resin contained in the conductive paste for forming an electrode layer as a binder and that of butyral system resin contained in the dielectric paste for forming a spacer layer as a binder to be equal to or larger than 64 mol % and equal to or smaller than 78 mol %.

In the present invention, it is preferable for the weight-average molecular weight of an acrylic system resin contained in the dielectric paste for forming a ceramic green sheet as a binder to be equal to or larger than 250,000 and equal to or smaller than 500,000.

In the present invention, it is preferable for the acid value of an acrylic system resin contained in the dielectric paste for forming a ceramic green sheet as a binder to be equal to or larger than 5 mgKOH/gram and equal to or smaller than 10 mgKOH/gram. In the case where an acrylic system resin whose acid value is equal to or larger than 5 mgKOH/gram and equal to or smaller than 10 mgKOH/gram is employed as the binder of the dielectric paste for forming a ceramic green sheet, it is possible to prepare the dielectric paste for forming a ceramic green sheet so as to have a desired viscosity and improve the dispersibility of the dielectric paste.

Further, in a study done by the inventors of the present invention, it was found that in the case of printing a conductive paste on a very thin ceramic green sheet to form an electrode layer and printing a dielectric paste on the very thin ceramic green sheet to form a spacer layer, the solvent contained in the conductive paste for forming the electrode layer and the solvent contained in the dielectric paste for forming the spacer layer dissolved or swelled a binder component contained in the ceramic green sheet and, on the other hand, the conductive paste and the dielectric paste permeated into the ceramic green sheet, thereby causing short circuit failure and that, therefore, it was preferable to form an electrode layer and a spacer layer on a support sheet separately from a ceramic green sheet and bond them onto the surface of the ceramic green sheet via an adhesive layer after drying them. However, in the case where the electrode layer and the spacer layer are formed on the support sheet separately from the ceramic green sheet in this manner, in order to make the support sheet easy to peel off from the electrode layer and the spacer layer, it is preferable to form a release layer containing the same binder as that contained in the ceramic green sheet on the support sheet, print a conductive paste on the release layer, thereby forming an electrode layer, and print a dielectric paste on the release layer, thereby forming a spacer layer. Even in the case of printing a conductive paste on the release layer containing the same binder as that contained in the ceramic green sheet to form an electrode layer and printing a dielectric paste on the release layer to form a spacer layer, when the release layer contains butyral resin as a binder and the conductive paste and the dielectric paste contain terpineol as a solvent, the binder contained in the release layer is dissolved by the solvents contained in the conductive paste and the dielectric paste, whereby pinholes and cracks are generated in the release layer and defects are generated in a multi-layered ceramic electronic component such as a multi-layered ceramic capacitor.

However, according to the present invention, the electrode layer is formed using a conductive paste containing a butyral system resin as a binder and at least one solvent selected from a group consisting of dihydroterpinyl oxyethanol, terpinyl oxyethanol, d-dihydrocarveol, l-citronellol, l-perillylalcohol and acetoxy-methoxyethoxy-cyclohexanol acetate as a solvent, and a spacer layer is preferably formed using a dielectric paste containing a butyral system resin as a binder and at least one solvent selected from a group consisting of dihydroterpinyl oxyethanol, terpinyl oxyethanol, d-dihydrocarveol, l-citronellol, l-perillylalcohol and acetoxy-methoxyethoxy-cyclohexanol acetate as a solvent, and the solvent selected from a group consisting of dihydroterpinyl oxyethanol, terpinyl oxyethanol, d-dihydrocarveol, l-citronellol, l-perillylalcohol and acetoxy-methoxyethoxy-cyclohexanol acetate hardly dissolves an acrylic system resin contained in a ceramic green sheet as a binder. Therefore, even in the case of forming a release layer containing the same binder as that contained in the ceramic green sheet, printing a conductive paste on the release layer to form an electrode layer and printing a dielectric paste on the release layer to form a spacer layer, it is possible to effectively prevent generation of pinholes and cracks in the release layer and effectively prevent generation of defects in a multi-layered ceramic electronic component such as a multi-layered ceramic capacitor.

TECHNICAL ADVANTAGES OF THE INVENTION

According to the present invention, it is possible to provide a conductive paste for an electrode layer of a multi-layered ceramic electronic component which does not dissolve a binder contained in a layer adjacent to the electrode layer and can reliably prevent short circuit failure from occurring in the multi-layered ceramic electronic component.

Further, according to the present invention, it is possible to provide a method for manufacturing a multi-layered unit for a multi-layered ceramic electronic component which can reliably prevent short circuit failure from occurring in a multi-layered ceramic electronic component.

DESCRIPTION OF THE PREFERRED EMBODIMENTS

In a preferred embodiment of the method for fabricating a multi-layered unit according to the present invention, a dielectric paste for a ceramic green sheet which contains an acrylic system resin as a binder is first prepared and is applied onto a long support sheet using an extrusion coater or a wire bar coater, thereby forming a coating layer.

A dielectric paste for forming a ceramic green sheet is normally prepared by kneading a dielectric material (ceramic powder) and an organic vehicle obtained by dissolving an acrylic system resin into an organic solvent.

It is preferable for the weight-average molecular weight of the acrylic system resin to be equal to or larger than 250,000 and equal to or smaller than 500,000 and it is preferable for the acid value of the acrylic system resin to be equal to or larger than 5 mgKOH/gram and equal to or smaller than 10 mgKOH/gram.

An organic solvent used for preparing the organic vehicle is not particularly limited and an organic solvent such as terpineol, butyl carbitol, acetone, toluene, ethyl acetate and the like can be used for preparing the organic vehicle.

The dielectric material can be selected from among various compounds capable of forming a composite oxide or oxide, such as a carbonate, nitrate, hydroxide, organic metallic compound and the like and mixtures thereof. The dielectric material is normally used in the form of a powder whose average particle diameter is about 0.1 μm to about 3.0 μm. The particle diameter of the dielectric raw material is preferably smaller than the thickness of the ceramic green sheet.

The amounts of the respective constituents contained in the dielectric paste is not particularly limited and the dielectric paste may be prepared so as to contain 100 weight parts of a dielectric material, about 1 weight part to about 5 weight parts of an acrylic system resin and about 120 weight parts to about 250 weight parts of a solvent, for example.

As occasion demands, the dielectric paste may contain additives selected from among various dispersing agents, plasticizing agents, accessory ingredient compounds, glass frits, insulating materials and the like. In the case of adding these additives to the dielectric paste, it is preferable to set the total content to be equal to or less than about 10 weight %.

As a support sheet coated with the dielectric paste, a polyethylene terephthalate film is employed, for example, and the surface of the support sheet may be coated with a silicon resin, an alkyd resin or the like in order to improve the releasability thereof.

The coating layer is then dried at a temperature of about 50° C. to about 100° C. for about 1 to about 20 minutes, whereby a ceramic green sheet is formed on the support sheet.

In the present invention, the thickness of the ceramic green sheet after drying is preferably equal to or thinner than 3 μm and more preferably equal to or thinner than 1.5 μm.

Next, a conductive paste for forming an electrode layer is printed on the ceramic green sheet formed on the long support sheet in a predetermined pattern using a screen printing machine, a gravure printing machine or the like.

It is preferable to form the electrode layer so as to have a dry thickness of about 0.1 μm to about 5 μm and it is more preferable to form the electrode layer so as to have a dry thickness of about 0.1 μm to about 1.5 μm.

The conductive paste usable for forming an electrode layer is prepared by kneading a conductive material containing any of various conductive metals or alloys, any of various oxides which will form a conductive material containing any of various conductive metals or alloys after baking, an organic metal compound, resinate or the like, and an organic vehicle prepared by dissolving a butyral system resin in an organic solvent.

In a preferred embodiment of the present invention, the conductive paste contains a butyral system resin as a binder and at least one solvent selected from a group consisting of dihydroterpinyl oxyethanol, terpinyl oxyethanol, d-dihydrocarveol, I-citronellol, I-perillylalcohol and acetoxy-methoxyethoxy-cyclohexanol acetate as a solvent.

Since the solvent selected from the group consisting of dihydroterpinyl oxyethanol, terpinyl oxyethanol, d-dihydrocarveol, I-citronellol, I-perillylalcohol and acetoxy-methoxyethoxy-cyclohexanol acetate hardly dissolves the acrylic system resin contained in a ceramic green sheet as a binder, even in the case of printing the conductive paste on a very thin ceramic green sheet, thereby forming an electrode layer, it is possible to effectively prevent the binder contained in the ceramic green sheet from being dissolved by the solvent contained in the conductive paste. Therefore, it is possible to effectively prevent generation of pinholes and cracks in the ceramic green sheet even in the case where the ceramic green sheet is very thin.

It is preferable for the degree of polymerization of a butyral system resin contained in the conductive paste to be equal to or larger than 1400 and equal to or smaller than 2600 and it is preferable for the degree of butyralization of a butyral system resin contained in the conductive paste to be equal to or larger than 64 mol % and equal to or smaller than 78 mol %.

As the conductive material used for preparing the conductive paste, Ni, Ni alloy or the mixture thereof is preferably used. The shape of the conductive material is not particularly limited. The conductive material particles may have a spherical shape or a scale-like shape, or the conductive material may contain spherical conductive material particles and scale-like conductive material particles. The average particle diameter of the conductive material is not particularly limited but a conductive material having an average particle diameter of about 0.1 μm to about 2 μm is normally used for preparing the electrode paste and the conductive material having an average particle diameter of about 0.2 μm to about 1 μm is preferably used for preparing the electrode paste.

The conductive paste preferably contains the binder in an amount about 2.5 weight parts to about 20 weight parts with respect to 100 weight parts of the conductive material.

The content of the solvent is preferably about 20 weight % to about 55 weight % with respect to the weight of the conductive paste.

In order to improve adhesion property, it is preferable for the conductive paste to contain a plasticizing agent. The plasticizing agent contained in the conductive paste is not particularly limited and illustrative examples thereof include phthalate ester, adipic acid, phosphate ester, glycols and the like. The conductive paste contains the plasticizing agent preferably in an amount of about 10 weight % to about 300 weight % with respect to 100 weight parts of the binder, more preferably in an amount of about 10 weight parts to about 200 weight parts. In the case where the amount of the plasticizing agent added to the conductive paste is too large, the strength of the electrode layer tends to be markedly lower.

As occasion demands, the conductive paste may contain additives selected from among various dispersing agents accessory ingredient compounds and the like.

Preferably, prior to forming an electrode layer or after forming an electrode layer and drying it, a dielectric paste containing a butyral system resin as a binder and at least one solvent selected from a group consisting of dihydroterpinyl oxyethanol, terpinyl oxyethanol, d-dihydrocarveol, I-citronellol, I-perillylalcohol and acetoxy-methoxyethoxy-cyclohexanol acetate as a solvent is printed on the surface of a ceramic green sheet in a complementary pattern to that of the electrode layer using a screen printing machine, a gravure printing machine or the like, thereby forming a spacer layer.

In the case where a spacer layer is formed on the surface of a ceramic green sheet in a complementary pattern to that of the electrode layer in this manner, it is possible to prevent a step from being formed between the surface of the electrode layer and the surface of the ceramic green sheet where no electrode layer is formed. Therefore, even in the case of laminating a number of multi-layered units each including a ceramic green sheet and an electrode layer and fabricating a multi-layered electronic component such as a multi-layered ceramic capacitor, it is possible to effectively prevent the thus fabricated multi-layered electronic component from being deformed and also effectively prevent delamination of layers from occurring.

Furthermore, as described above, since the solvent selected from the group consisting of dihydroterpinyl oxyethanol, terpinyl oxyethanol, d-dihydrocarveol, I-citronellol, I-perillylalcohol and acetoxy-methoxyethoxy-cyclohexanol acetate hardly dissolves the acrylic system resin contained in the ceramic green sheet as a binder, even in the case of printing the dielectric paste on a very thin ceramic green sheet, thereby forming a spacer layer, it is possible to effectively prevent the binder contained in the ceramic green sheet from being dissolved by the solvent contained in the dielectric paste and it is therefore possible to effectively prevent generation of pinholes and cracks in the ceramic green sheet even when the ceramic green sheet is very thin.

The dielectric paste is prepared in the similar manner to the dielectric paste for forming the ceramic green sheet except that different binder and solvent are used.

It is preferable for the degree of polymerization of butyral system resin contained in the dielectric paste for forming the spacer layer as a binder to be equal to or larger than 1400 and equal to or smaller than 2600 and it is preferable for the degree of butyralization of butyral system resin contained in the dielectric paste for forming the spacer layer as a binder to be equal to or larger than 64 mol % and equal to or smaller than 78 mol %.

Then, the electrode layer or the electrode layer and the spacer layer are dried and a multi-layered unit including the ceramic green sheet and electrode layer or the electrode layer and the spacer layer laminated on the support sheet is fabricated.

When a multi-layered ceramic capacitor is to be fabricated, the support sheet is peeled off from the ceramic green sheet of the multi-layered unit and the multi-layered unit is diced to predetermined dimensions. Then, a predetermined number of the multi-layered units are laminated on the outer layer of a multi-layered ceramic capacitor and the other outer layer of a multi-layered ceramic capacitor is further laminated on the multi-layered units, thereby fabricating a laminated body.

Next, the thus obtained laminated body is press molded and diced to predetermined dimensions, thereby fabricating ceramic green chips.

The thus fabricated ceramic green chips are placed in a reducing gas atmosphere so that the binder is removed therefrom and the ceramic green chips are baked.

Necessary external electrodes are then attached to the thus baked ceramic green chip, thereby manufacturing a multi-layered ceramic capacitor.

According to this embodiment, the electrode is formed by printing the conductive paste containing a butyral system resin as a binder and at least one solvent selected from a group consisting of dihydroterpinyl oxyethanol, terpinyl oxyethanol, d-dihydrocarveol, I-citronellol, I-perillylalcohol and acetoxy-methoxyethoxy-cyclohexanol acetate as a solvent on the ceramic green sheet containing an acrylic system resin as a binder in a predetermined pattern and the solvent selected from the group consisting of dihydroterpinyl oxyethanol, terpinyl oxyethanol, d-dihydrocarveol, I-citronellol, I-perillylalcohol and acetoxy-methoxyethoxy-cyclohexanol acetate hardly dissolves an acrylic system resin contained in a ceramic green sheet as a binder. As a result, even in the case of printing the conductive paste on a very thin ceramic green sheet, thereby forming an electrode layer, it is possible to effectively prevent the binder contained in the ceramic green sheet from being dissolved by the solvent contained in the conductive paste. Therefore, even in the case where the ceramic green sheet is very thin, it is possible to effectively prevent generation of pinholes and cracks in a ceramic green sheet, thereby effectively preventing short circuit failure from occurring in a multi-layered ceramic electronic component.

Further, according to this embodiment, since the spacer layer is formed on the surface of the ceramic green sheet in a complementary pattern to that of the electrode layer, it is possible to prevent a step from being formed between the surface of the electrode layer and the surface of the ceramic green sheet where no electrode layer is formed. Therefore, even in the case of laminating a number of multi-layered units each including a ceramic green sheet and an electrode layer and fabricating a multi-layered electronic component such as a multi-layered ceramic capacitor, it is possible to effectively prevent the thus fabricated multi-layered electronic component from being deformed and also effectively prevent delamination of layers from occurring.

Furthermore, according to this embodiment, the spacer layer is formed by printing the dielectric paste containing a butyral system resin as a binder and at least one solvent selected from a group consisting of dihydroterpinyl oxyethanol, terpinyl oxyethanol, d-dihydrocarveol, I-citronellol, I-perillylalcohol and acetoxy-methoxyethoxy-cyclohexanol acetate as a solvent on the ceramic green sheet containing an acrylic system resin as a binder in a complementary pattern to that of the electrode layer and the solvent selected from the group consisting of dihydroterpinyl oxyethanol, terpinyl oxyethanol, d-dihydrocarveol, I-citronellol, I-perillylalcohol and acetoxy-methoxyethoxy-cyclohexanol acetate hardly dissolves an acrylic system resin contained in a ceramic green sheet as a binder. As a result, even in the case of printing the dielectric paste on a very thin ceramic green sheet, thereby forming a spacer layer, it is possible to reliably prevent the binder contained in the ceramic green sheet from being dissolved by the solvent contained in the conductive paste and the ceramic green sheet from being swelled, thereby generating pinholes and cracks on the surface of the spacer layer. Therefore, in the case of laminating a number of multi-layered units each including a ceramic green sheet and an electrode layer and fabricating a multi-layered electronic component such as a multi-layered ceramic capacitor, it is possible to reliably prevent generation of voids in the multi-layered electronic component.

In another preferred embodiment of the present invention, a second support sheet is provided separately from the long support sheet used for forming the ceramic green sheet and the surface of the long second support sheet is coated using a wire bar coater or the like with a dielectric paste containing particles of a dielectric material having substantially the same composition as that of the dielectric material contained in the ceramic green sheet and the same binder as that contained in the ceramic green sheet, thereby forming a coating layer and the coating layer is dried to form a release layer.

As the second support sheet, a polyethylene terephthalate film is employed, for example, and the surface of the second support sheet may be coated with a silicon resin, an alkyd resin or the like in order to improve the releasability thereof.

The thickness of the release layer is preferably equal to or thinner than that of an electrode layer, more preferably equal to or thinner than about 60% of the electrode layer thickness and most preferably equal to or thinner than about 30% of the electrode layer thickness.

After the release layer has been dried, the conductive paste for an electrode layer prepared in the above described manner is printed on the surface of the release layer in a predetermined pattern using a screen printing machine, a gravure printing machine or the like, thereby forming an electrode layer.

It is preferable to form the electrode layer so as to have a thickness of about 0.1 μm to about 5 μm and it is more preferable to form the electrode layer so as to have a thickness of about 0.1 μm to about 1.5 μm.

In this embodiment, the conductive paste contains a butyral system resin as a binder and at least one solvent selected from a group consisting of dihydroterpinyl oxyethanol, terpinyl oxyethanol, d-dihydrocarveol, I-citronellol, I-perillylalcohol and acetoxy-methoxyethoxy-cyclohexanol acetate as a solvent.

Since a solvent selected from the group consisting of dihydroterpinyl oxyethanol, terpinyl oxyethanol, d-dihydrocarveol, I-citronellol, I-perillylalcohol and acetoxy-methoxyethoxy-cyclohexanol acetate hardly dissolves an acrylic system resin contained in a ceramic green sheet as a binder, even in the case of forming a release layer containing the same binder as that of the ceramic green sheet and printing the conductive paste on the release layer to form an electrode layer, it is possible to effectively prevent generation of pinholes and cracks in the release layer and effectively prevent generation of defects in a multi-layered ceramic electronic component such as a multi-layered ceramic capacitor.

It is preferable for the degree of polymerization of butyral system resin contained in the conductive paste as a binder to be equal to or larger than 1400 and equal to or smaller than 2600 and it is preferable for the degree of butyralization of butyral system resin contained in the conductive paste as a binder to be equal to or larger than 64 mol % and equal to or smaller than 78 mol %.

Preferably, prior to forming an electrode layer or after forming an electrode layer and drying it, a dielectric paste containing a butyral system resin as a binder and at least one solvent selected from a group consisting of dihydroterpinyl oxyethanol, terpinyl oxyethanol, d-dihydrocarveol, I-citronellol, I-perillylalcohol and acetoxy-methoxyethoxy-cyclohexanol acetate as a solvent and prepared in the above described manner is printed on the surface of the second support sheet in a complementary pattern to that of the electrode layer using a screen printing machine, a gravure printing machine or the like, thereby forming a spacer layer.

In the case where the spacer layer is formed on the surface of a ceramic green sheet in a complementary pattern to that of the electrode layer in this manner, it is possible to prevent a step from being formed between the surface of the electrode layer and the surface of the ceramic green sheet where no electrode layer is formed. Therefore, even in the case of laminating a number of multi-layered units each including a ceramic green sheet and an electrode layer and fabricating a multi-layered electronic component such as a multi-layered ceramic capacitor, it is possible to effectively prevent the thus fabricated multi-layered electronic component from being deformed and also effectively prevent delamination of layers from occurring.

Further, as described above, since the solvent selected from the group consisting of dihydroterpinyl oxyethanol, terpinyl oxyethanol, d-dihydrocarveol, I-citronellol, I-perillylalcohol and acetoxy-methoxyethoxy-cyclohexanol acetate hardly dissolves the acrylic system resin contained in the ceramic green sheet as a binder, even in the case of forming the release layer containing the same binder as that of the ceramic green sheet and printing a dielectric paste on the release layer to form a spacer layer, it is possible to effectively prevent generation of pinholes and cracks in the release layer and effectively prevent generation of defects in a multi-layered ceramic electronic component such as a multi-layered ceramic capacitor.

It is preferable for the degree of polymerization of butyral system resin contained in the dielectric paste for forming the release layer as a binder to be equal to or larger than 1400 and equal to or smaller than 2600 and it is preferable for the degree of butyralization of butyral system resin contained in the dielectric paste for forming the release layer as a binder to be equal to or larger than 64 mol % and equal to or smaller than 78 mol %.

Further, a long third support sheet is provided and the surface of the third support sheet is coated with an adhesive agent solution using a bar coater, an extrusion coater, a reverse coater, a dip coater, a kiss coater or the like and the coating layer is dried, thereby forming an adhesive layer.

It is preferable for the adhesive agent solution to contain a binder belonging to the same group as that the binder contained in the ceramic green sheet belongs to, particles of a dielectric material having substantially the same composition as that of dielectric particles contained in the ceramic green sheet, a plasticizing agent, an antistatic agent and a release agent.

It is preferable to form an adhesive layer so as to have a thickness thinner than about 0.3 µm, more preferable to form it so as to have a thickness of about 0.02 µm to about 0.3 µm and particularly preferable to form it so as to have a thickness of about 0.02 µm to about 0.2 µm.

The adhesive layer formed on the long third support sheet in this manner is bonded onto the surface of the electrode layer or the surfaces of the electrode layer and the spacer layer formed on the long second support sheet or the surface of the ceramic green sheet formed on the support sheet and the third support sheet then is peeled off from the adhesive layer, whereby the adhesive layer is transferred onto the surface of the electrode layer or the surfaces of the electrode layer and the spacer layer or the surface of the ceramic green sheet.

In the case where the adhesive layer is transferred onto the surface of the electrode layer or the surfaces of the electrode layer and the spacer layer, the ceramic green sheet formed on the long support sheet is bonded onto the adhesive layer and the support sheet is peeled off from the ceramic green sheet so that the ceramic green sheet is transferred onto the surface of the adhesive layer, thereby fabricating a multi-layered unit including the ceramic green sheet and the electrode layer.

An adhesive layer is transferred onto the surface of the ceramic green sheet of the thus fabricated multi-layered unit in a similar manner to that of transferring the adhesive layer onto the surface of the electrode layer or the surfaces of the electrode layer and the spacer layer and the multi-layered unit including the adhesive layer transferred onto the surface thereof is diced to predetermined dimensions.

Similarly, a predetermined number of multi-layered units each including the adhesive layer transferred onto the surface thereof are fabricated and the predetermined number of multi-layered units are laminated, thereby fabricating a multi-layered block.

When a multi-layered block is to be fabricated, the multi-layered unit is first positioned on a support formed of polyethylene terephthalate or the like in such a manner that the adhesive layer transferred onto the surface of the multi-layered unit comes into contact with the support and the multi-layered unit is pressed by a pressing machine or the like, whereby the multi-layered unit is bonded onto the support via the adhesive layer.

Afterwards, the second support sheet is peeled off from the release layer and the multi-layered unit is laminated on the support.

Then, a new multi-layered unit is positioned on the surface of the release layer of the multi-layered unit laminated on the support in such a manner that an adhesive layer formed on the new multi-layered unit comes into contact with the surface of the release layer and the multi-layered unit is pressed using a pressing machine or the like, whereby the new multi-layered unit is laminated on the surface of the release layer of the multi-layered unit laminated on the support via the adhesive layer. Afterwards, the second support sheet is peeled off from the release layer of the new multi-layered unit.

Similar processes are repeated, thereby fabricating a multi-layered block including a predetermined number of the laminated multi-layered units.

On the other hand, in the case where the adhesive layer is transferred onto the surface of the ceramic green sheet, the electrode layer or the electrode layer and the spacer layer formed on the second support sheet are bonded onto the adhesive layer and then, the second support sheet is peeled off from the release layer, the electrode layer or the electrode layer and the spacer layer and the release layer are transferred onto the surface of the adhesive layer. Thus, a multi-layered unit including the ceramic green sheet and the electrode layer is fabricated.

An adhesive layer is transferred onto the surface of the release layer of the thus obtained multi-layered unit in a similar manner to that of transferring the adhesive layer onto the surface of the ceramic green sheet and the multi-layered unit including the adhesive layer transferred onto the surface thereof is diced to predetermined dimensions.

Similarly, a predetermined number of multi-layered units each including the adhesive layer transferred onto the surface thereof are fabricated and the predetermined number of multi-layered units are laminated, thereby fabricating a multi-layered block.

When a multi-layered block is to be fabricated, the multi-layered unit is first positioned on a support formed of polyethylene terephthalate or the like in such a manner that the adhesive layer transferred onto the surface of the multi-layered unit comes into contact with the support and the multilayered unit is pressed by a pressing machine or the like, whereby the multi-layered unit is bonded onto the support via the adhesive layer.

Afterwards, the support sheet is peeled off from the ceramic green sheet and the multi-layered unit is laminated on the support.

Then, a new multi-layered unit is positioned on the surface of the ceramic green sheet of the multi-layered unit laminated on the support in such a manner that an adhesive layer formed on the new multi-layered unit comes into contact with the surface of the ceramic green sheet and the multi-layered unit is pressed using a pressing machine or the like, whereby the new multi-layered unit is laminated on the surface of the ceramic green sheet of the multi-layered unit laminated on the support via the adhesive layer. Afterwards, the support sheet is peeled off from the release layer of the new multi-layered unit.

Similar processes are repeated, thereby fabricating a multi-layered block including a predetermined number of the laminated multi-layered units.

The thus fabricated multi-layered block including the predetermined number of the laminated multi-layered units is laminated on the outer layer of a multi-layered ceramic capacitor and the other outer layer of a multi-layered ceramic capacitor is further laminated on the multi-layered block, thereby fabricating a laminated body. Next, the thus obtained laminated body is press molded and diced to predetermined dimensions, thereby fabricating a number of ceramic green chips.

The thus fabricated ceramic green chips are placed in a reducing gas atmosphere so that the binder is removed therefrom and the ceramic green chips are baked.

Necessary external electrodes are then attached to the thus baked ceramic green chip, thereby manufacturing a multi-layered ceramic capacitor.

According to this preferred embodiment, since the electrode layer and the spacer layer formed on the second support sheet are dried and then bonded onto the surface of the ceramic green sheet via the adhesive layer, unlike in the case of printing a conductive paste on the surface of the ceramic green sheet to form an electrode layer and printing a dielectric paste on the surface of the ceramic green sheet to form a spacer layer, it is possible to prevent the conductive paste and the dielectric paste from permeating into the ceramic green sheet and it is therefore possible to laminate the electrode layer and the spacer layer on the surface of the ceramic green sheet in a desired manner.

Furthermore, according to this preferred embodiment, the electrode layer is formed using the conductive paste containing a butyral system resin as a binder and at least one solvent selected from a group consisting of dihydroterpinyl oxyethanol, terpinyl oxyethanol, d-dihydrocarveol, I-citronellol, I-perillylalcohol and acetoxy-methoxyethoxy-cyclohexanol acetate as a solvent and the solvent selected from the group consisting of dihydroterpinyl oxyethanol, terpinyl oxyethanol, d-dihydrocarveol, I-citronellol, I-perillylalcohol and acetoxy-methoxyethoxy-cyclohexanol acetate hardly dissolves an acrylic system resin contained in a ceramic green sheet as a binder. Therefore, even in the case of forming a release layer containing the same binder as that contained in the ceramic green sheet and printing a conductive paste on the release layer to form an electrode layer, it is possible to effectively prevent generation of pinholes and cracks in the release layer and effectively prevent generation of defects in a multi-layered ceramic electronic component such as a multi-layered ceramic capacitor.

Moreover, according to this preferred embodiment, the spacer layer is formed using the dielectric paste containing a butyral system resin as a binder and at least one solvent selected from a group consisting of dihydroterpinyl oxyethanol, terpinyl oxyethanol, d-dihydrocarveol, I-citronellol, I-perillylalcohol and acetoxy-methoxyethoxy-cyclohexanol acetate as a solvent and a solvent selected from a group consisting of dihydroterpinyl oxyethanol, terpinyl oxyethanol, d-dihydrocarveol, I-citronellol, I-perillylalcohol and acetoxy-methoxyethoxy-cyclohexanol acetate hardly dissolves an acrylic system resin contained in a ceramic green sheet as a binder. Therefore, even in the case of forming a release layer containing the same binder as that contained in the ceramic green sheet and printing a dielectric paste on the release layer to form a spacer layer, it is possible to effectively prevent generation of pinholes and cracks in the release layer and effectively prevent generation of defects in a multi-layered ceramic electronic component such as a multi-layered ceramic capacitor.

In a further preferred embodiment, in the case where the adhesive layer is transferred onto the surface of the electrode layer or the surfaces of the electrode layer and the spacer layer, an adhesive layer is transferred onto the surface of a ceramic green sheet of a multi-layered unit fabricated by laminating a release layer, an electrode layer or an electrode layer and a spacer layer, an adhesive layer and a ceramic green sheet on a long second support sheet and without cutting the multi-layered unit, a release layer of another multi-layered unit fabricated by laminating a ceramic green sheet, an adhesive layer, an electrode layer or an electrode layer and a spacer layer, and the release layer on a long support sheet is bonded onto the adhesive layer and the support sheet is peeled off from the ceramic green sheet, whereby two multi-layered units are laminated on the long second support sheet.

Then, an adhesive layer formed on a third support sheet is transferred onto the ceramic green sheet located on the side of the surface of the laminated two multi-layered units and a release layer of another multi-layered unit fabricated by laminating a ceramic green sheet, an adhesive layer, an electrode layer or an electrode layer and a spacer layer, and the release layer on a long support sheet is bonded onto the adhesive layer and the support sheet is peeled off from the ceramic green sheet.

Similar processes are repeated, thereby fabricating a multi-layered unit set including a predetermined number of laminated multi-layered units. Further, an adhesive layer formed on the third support sheet is transferred onto the surface of the ceramic green sheet located on the side of the surface of the multi-layered unit set, thereby fabricating a laminated body and the laminated body is diced to predetermined dimensions, thereby fabricating a multi-layered blocks.

On the other hand, in the case where the adhesive layer is transferred onto the surface of the ceramic green sheet, an adhesive layer is transferred onto the surface of a release layer of a multi-layered unit fabricated by laminating a ceramic green sheet, an adhesive layer, an electrode layer or an electrode layer and a spacer layer, and the release layer on a long support sheet and without cutting the multi-layered unit, a ceramic green sheet of another multi-layered unit fabricated by laminating a release layer, an electrode layer or an electrode layer and a spacer layer, an adhesive layer and a ceramic green sheet on a long second support sheet is bonded onto the adhesive layer and the second support sheet is peeled off from the release layer, whereby two multi-layered units are laminated on the long second support sheet.

Then, an adhesive layer formed on a third support sheet is transferred onto the release layer located on the side of the surface of the laminated two multi-layered units and a ceramic green sheet of a multi-layered unit fabricated by a release layer, an electrode layer or an electrode layer and a spacer layer, an adhesive layer and a ceramic green sheet on a long second support sheet is further laminated on the adhesive layer. Then, the second support sheet is peeled off from the release layer.

Similar processes are repeated, thereby fabricating a multi-layered unit set including a predetermined number of laminated multi-layered units. Further, an adhesive layer formed on the third support sheet is transferred onto the surface of the ceramic green sheet located on the side of the surface of the multi-layered unit set, thereby fabricating a laminated body and the laminated body is diced to predetermined dimensions, thereby fabricating multi-layered blocks.

A multi-layered ceramic capacitor is fabricated using the thus fabricated multi-layered blocks in the manner of the previous preferred embodiment.

According to this preferred embodiment, since the multi-layered units are successively laminated on the long second support sheet or support sheet, thereby fabricating the multi-layered unit set including a predetermined number of multi-layered units and the multi-layered unit set is diced to predetermined dimensions, thereby fabricating multi-layered blocks, it is possible to markedly improve the manufacturing efficiency of the multi-layered blocks in comparison with the case where multi-layered blocks are fabricated by laminating multi-layered units each of which has been diced to predetermined dimensions.

In a further preferred embodiment of the present invention, in the case where the adhesive layer is transferred onto the surface of the electrode layer or the surfaces of the electrode layer and the spacer layer, an adhesive layer is transferred onto the surface of a ceramic green sheet of a multi-layered unit fabricated by laminating a release layer, an electrode layer or an electrode layer and a spacer layer, an adhesive layer and a ceramic green sheet on a long second support sheet and without cutting the multi-layered unit, an electrode layer or an electrode layer and a spacer layer formed on the second support sheet are bonded onto the adhesive layer and the second support sheet is peeled off from the release layer, whereby the electrode layer or the electrode layer and the spacer layer, and the release layer are transferred onto the surface of the adhesive layer.

Then, an adhesive layer formed on a third support sheet is transferred onto the surface of the release layer transferred onto the adhesive layer, a ceramic green sheet formed on the support sheet is bonded onto the adhesive layer and the support sheet is peeled off from the ceramic green sheet, whereby the ceramic green sheet is transferred onto the surface of the adhesive layer.

Further, an adhesive layer formed on a third support sheet is transferred onto the surface of the ceramic green sheet transferred onto the surface of the adhesive layer, an electrode layer or an electrode layer and a spacer layer formed on the second support sheet are bonded onto the adhesive layer and the second support sheet is peeled off from the release layer, whereby the electrode layer or the electrode layer and the spacer layer, and the release layer are transferred onto the surface of the adhesive layer.

Similar processes are repeated, thereby fabricating a multi-layered unit set including a predetermined number of laminated multi-layered units. Further, an adhesive layer formed on the third support sheet is transferred onto the surface of the ceramic green sheet located on the side of the surface of the multi-layered unit set, thereby fabricating a laminated body and the laminated body is diced to predetermined dimensions, thereby fabricating multi-layered blocks.

On the other hand, in the case where the adhesive layer is transferred onto the surface of the ceramic green sheet, an adhesive layer is transferred onto the surface of a release layer of a multi-layered unit fabricated by laminating a ceramic green sheet, an adhesive layer, an electrode layer or an electrode layer and a spacer layer, and the release layer on a long support sheet and without cutting the multi-layered unit, a ceramic green sheet of a support sheet is bonded onto the adhesive layer and the support sheet is peeled off from the ceramic green sheet, whereby the ceramic green sheet is transferred onto the adhesive layer.

Further, an adhesive layer formed on the third support sheet is transferred onto the ceramic green sheet transferred onto the adhesive layer and an electrode layer or an electrode layer and a spacer layer formed on the second support sheet is bonded onto the adhesive layer. Then, the second support sheet is peeled off from the release layer, whereby the electrode layer or the electrode layer and the spacer layer, and the release layer are transferred onto the surface of the adhesive layer.

Further, an adhesive layer formed on the third support sheet is transferred onto the release layer transferred onto the adhesive layer and a ceramic green sheet formed on the support sheet is bonded onto the adhesive layer. Then, the support sheet is peeled off from the ceramic green sheet, whereby the ceramic green sheet is transferred onto the surface of the adhesive layer.

Similar processes are repeated, thereby fabricating a multi-layered unit set including a predetermined number of laminated multi-layered units. Further, an adhesive layer is transferred onto the surface of the release layer located on the side of the surface of the multi-layered unit set, thereby fabricating a laminated body and the laminated body is diced to predetermined dimensions, thereby fabricating multi-layered blocks.

A multi-layered ceramic green sheet is fabricated using the thus fabricated multi-layered block in the manner of the previous embodiment.

According to this preferred embodiment, the transferring of the adhesive layer, the transferring of the electrode layer or the electrode layer and the spacer layer and the release layer, the transferring of the adhesive layer and the transferring of the ceramic green sheet onto the long second support sheet or support sheet are repeated, thereby successively laminating the multi-layered units to fabricate the multi-layered unit set including a predetermined number of multi-layered units and the multi-layered unit set is diced to predetermined dimensions, thereby fabricating multi-layered blocks. As a result, it is possible to markedly improve the manufacturing efficiency of the multi-layered block in comparison with the case where multi-layered blocks are fabricated by laminating multi-layered units each of which has been diced to predetermined dimensions.

WORKING EXAMPLES

Hereinafter, working examples and comparative examples will be set out in order to further clarify the advantages of the present invention.

Working Example 1

Preparation of a Dielectric Paste for Forming a Ceramic Green Sheet 1.48 weight parts of $(BaCa)SiO_3$, 1.01 weight parts of $Y_2O_3$, 0.72 weight part of $MgCO_3$, 0.13 weight part of MnO and 0.045 weight part of $V_2O_5$ were mixed, thereby preparing an additive powder.

159.3 weight parts of ethyl cellulose and 0.93 weight parts of polyethylene glycol system dispersing agent were added to 100 weight parts of the thus prepared additive powder to prepare a slurry and the additives contained in the slurry were pulverized.

When the additives contained in the slurry were to be pulverized, 11.2 grams of the slurry and 450 grams of $ZrO_2$ beads having a diameter of 2 mm were charged in a polyethylene vessel having an inner volume of 250 cc and the polyethylene vessel was rotated at the circumferential velocity of 45 m/min for sixteen hours, thereby pulverizing the additive powder to prepare the additive slurry.

The median diameter of the additives after pulverization was 0.1 μm.

Then, 15 weight parts of a copolymer of methyl methacrylate and butyl acrylate whose acid value was 5 mgKOH/gram, copolymerization ratio (weight ratio) was 82:18 and weight-average molecular weight was 450,000 was dissolved into 85 weight parts of ethyl acetate at 50° C., thereby preparing an organic vehicle solution of 15%. Further, a slurry having the composition set out below was mixed with the organic vehicle solution for twenty hours using a polyethylene vessel having an inner volume of 500 cc, thereby preparing a dielectric paste. When the slurry was to be mixed with the organic vehicle solution, 344.1 grams of the slurry and 900 grams of $ZrO_2$ beads having a diameter of 2 mm were charged in the polyethylene vessel and the polyethylene vessel was rotated at the circumferential velocity of 45 m/min.

| | |
|---|---|
| $BaTiO_3$ powder ("BT-02" (Product Name) manufactured by SAKAI CHEMICAL INDUSTRY CO., LTD.: particle diameter 0.2 μm) | 100 weight parts |
| additive slurry | 11.2 weight parts |
| ethyl acetate | 163.76 weight parts |
| toluene | 21.48 weight parts |
| polyethylene glycol system dispersing agent | 1.04 weight parts |
| antistatic auxiliary agent | 0.83 weight parts |
| diacetone alcohol | 1.04 weight parts |
| benzyl butyl phthalate (plasticizing agent) | 2.61 weight parts |
| butyl stearate | 0.52 weight parts |
| mineral sprit | 6.78 weight parts |
| organic vehicle | 34.77 weight parts |

As a polyethylene glycol system dispersing agent, a dispersing agent which was obtained by denaturing polyethylene glycol with aliphatic acid and whose hydrophile-lipophile balance (HLB) was 5 to 6 was employed and as an antistatic auxiliary agent, polyethylene glycol whose average molecular weight was 400.

Formation of a Ceramic Green Sheet

A polyethylene terephthalate film was coated with the thus prepared dielectric paste using a die coater at a coating velocity of 50 m/minutes, thereby forming a coating layer and the thus formed coating layer was dried in a drying furnace whose temperature was held at 80° C., thereby forming a ceramic green sheet having a thickness of 1 μm.

Preparation of a Conductive Paste for Forming an Electrode Layer 1.48 weight parts of $(BaCa)SiO_3$, 1.01 weight parts of $Y_2O_3$, 0.72 weight part of $MgCO_3$, 0.13 weight part of MnO and 0.045 weight part of $V_2O_5$ were mixed, thereby preparing an additive powder.

150 weight parts of acetone, 104.3 weight parts of dihydroterpinyl oxyethanol and 1.5 weight parts of polyethylene glycol system dispersing agent were added to 100 weight parts of the thus prepared additive powder to prepare a slurry and the additives contained in the slurry were pulverized using a pulverizer "LMZ0.6" (Product name) manufactured by Ashizawa Finetech Co., Ltd.

When the additives contained in the slurry were to be pulverized, $ZrO_2$ beads having a diameter of 0.1 mm were charged into a vessel so as to occupy 80 volume % of the vessel, a rotor was rotated at the circumferential velocity of 14 m/min and the slurry was circulated between the vessel and a slurry tank until holding time of the whole slurry of two liters became 5 minutes, thereby pulverizing the additives contained in the slurry.

The median diameter of the additives after pulverization was 0.1 μm.

Then, acetone was evaporated using an evaporator and removed from the slurry, thereby preparing an additive paste in which the additives were dispersed in dihydroterpinyl oxyethanol. The concentration of the additives contained in the additive paste was 49.3 weight %.

Further, 8 weight parts of polyvinyl butyral whose degree of polymerization was 2400, degree of butyralization was 69 mol % and degree of acetalization was 12% was dissolved into 92 weight parts of dihydroterpinyl oxyethanol at 70° C., thereby preparing an 8% organic vehicle solution. Further, a slurry having the composition set out below was dispersed in the organic vehicle solution for sixteen hours using a ball mill having an inner volume of 500 cc. The dispersing conditions were set so that the amount of charged $ZrO_2$ having a diameter of 2.0 mm was 30 volume % of the ball mill, the amount of the slurry in the ball mill was 60 volume % and the circumferential velocity of the ball mill was 45 m/min.

| | |
|---|---|
| nickel powder manufactured by Kawatetsu Industry Co., Ltd. and having a particle diameter of 0.2 μm | 100 weight parts |
| additive paste | 1.77 weight parts |
| $BaTiO_3$ powder manufactured by SAKAI CHEMICAL INDUSTRY CO., LTD. | 19.14 weight parts |
| organic vehicle | 56.25 weight parts |
| polyethylene glycol system dispersing agent | 1.19 weight parts |
| dioctyl phthalate (plasticizing agent) | 2.25 weight parts |
| dihydroterpinyl oxyethanol | 83.96 weight parts |
| acetone | 56 weight parts |

Then, acetone was evaporated using a stirring device having an evaporator and a heating mechanism and removed from the slurry, thereby preparing a conductive paste. The concentration of the dielectric material contained in the conductive paste was 47 weight %.

Formation of an Electrode Layer and Fabrication of a Multi-layered Unit

The thus prepared conductive paste was printed on the ceramic green sheet in a predetermined pattern using a screen printing machine and dried at 90° C. for five minutes, thereby forming an electrode layer having a thickness of 1 μm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. As a result, it was found that the surface roughness (Ra) of the electrode layer was 0.062 µm.

Further, the surface of the electrode layer was observed at four-hundred magnifications using a metallographic microscope. As a result, it was found that the surface of the electrode layer was free of cracks and wrinkles.

Fabrication of a Ceramic Green Chip

The surface of a polyethylene terephthalate film was coated with the dielectric paste prepared in the above described manner using a die coater, thereby forming a coating layer, and the coating layer was dried, thereby forming a ceramic green sheet having a thickness of 10 µm.

The thus formed ceramic green sheet was peeled off from the polyethylene terephthalate film and diced. Five of the diced ceramic green sheet units were laminated to form a cover layer having a thickness of 50 µm. Further, the multi-layered unit was peeled off from the polyethylene terephthalate film and diced and fifty of the diced multi-layered units were laminated on the cover layer.

Then, the ceramic green sheet having a thickness of 10 µm was peeled off from the polyethylene terephthalate film and diced and five of the ceramic green sheet units were laminated on the multi-layered units laminated on the cover layer, thereby fabricating a laminated body including the lower cover layer having a thickness of 50 µm, an active layer having a thickness of 100 µm and including the laminated fifty multi-layered units each including the ceramic green sheet having a thickness of 1 µm and the electrode layer having a thickness of 1 µm, and an upper cover layer having a thickness of 50 µm.

Further, a pressure of 100 MPa was applied onto the thus fabricated laminated body at 70° C., thereby press molding the laminated body and the laminated body was diced to predetermined dimensions using a dicing machine, thereby fabricating ceramic green chips.

Fabrication of a Multi-layered Ceramic Capacitor Sample

The thus fabricated ceramic green chip was processed under the following conditions in an air atmosphere to remove the binder.

Temperature rising rate: 50° C./hour
Holding temperature: 240° C.
Holding time period: 8 hours After removing the binder, the ceramic green chip was processed and baked under the following conditions in a mixed gas atmosphere of a nitrogen gas and a hydrogen gas whose temperature was controlled at the dew point 20° C. The contents of the nitrogen gas and the hydrogen gas contained in the mixed gas were 95 volume % and 5 volume %, respectively.

Temperature rising rate: 300° C./hour
Holding temperature: 1200° C.
Holding time period: 2 hours
Cooling rate: 300° C./hour The thus baked ceramic green chip was subjected to an annealing processing under the following conditions in a nitrogen gas atmosphere whose temperature was controlled at the dew point 20° C.

Temperature rising rate: 300° C./hour
Holding temperature: 1000° C.
Holding time period: 3 hours
Cooling rate: 300° C./hour End surfaces of the thus obtained sintered body were polished by the sandblast and coated with In—Ga alloy, thereby forming a terminal electrode. Thus, a multi-layered ceramic capacitor sample was fabricated.

A total of fifty multi-layered ceramic capacitor samples were fabricated in a manner similar to the foregoing.

Measurement of Short-circuit Failure Ratio

The resistance value of each of the thus fabricated multi-layered ceramic capacitor samples was measured using a multi-meter to check whether or not short-circuit failure occurred therein.

In the case where the thus measured resistance value was equal to or lower than 100 KΩ, it was judged that short-circuit failure occurred in the multi-layered ceramic capacitor sample. The number of the ceramic capacitor samples in which short-circuit failure occurred was measured and the ratio of the number of the ceramic capacitor samples in which short-circuit failure occurred to the total number of the fabricated multi-layered ceramic capacitor samples was calculated and defined as the short-circuit failure ratio.

As a result, the short-circuit failure ratio of the multi-layered ceramic capacitor samples was found to be 6%.

Working Example 2

An electrode layer was formed on a ceramic green sheet in the manner of Working Example 1 except that terpinyl oxyethanol was used instead of dihydroterpinyl oxyethanol as the solvent for preparing the conductive paste for forming the electrode layer. Then, the surface roughness (Ra) of the electrode layer was measured. As a result, it was found that the surface roughness (Ra) of the electrode layer was 0.066 µm.

Further, the surface of the electrode layer was observed at four-hundred magnifications using a metallographic microscope. As a result, it was found that the surface of the electrode layer was free of cracks and wrinkles.

Furthermore, fifty multi-layered ceramic capacitor samples were fabricated in the manner of Working Example 1 and the resistance value of each of the thus fabricated multi-layered ceramic capacitor samples was measured using a multi-meter to determine the short-circuit failure ratio of the multi-layered ceramic capacitor samples. As a result, the short-circuit failure ratio of the multi-layered ceramic capacitor samples was found to be 10%.

Working Example 3

An electrode layer was formed on a ceramic green sheet in the manner of Working Example 1 except that d-dihydrocarveol was used instead of dihydroterpinyl oxyethanol as the solvent for preparing the conductive paste for forming the electrode layer. Then, the surface roughness (Ra) of the electrode layer was measured. As a result, it was found that the surface roughness (Ra) of the electrode layer was 0.069 µm.

Further, the surface of the electrode layer was observed at four-hundred magnifications using a metallographic microscope. As a result, it was found that the surface of the electrode layer was free of cracks and wrinkles.

Furthermore, fifty multi-layered ceramic capacitor samples were fabricated in the manner of Working Example 1 and the resistance value of each of the thus fabricated multi-layered ceramic capacitor samples was measured using a multi-meter to determine the short-circuit failure ratio of the multi-layered ceramic capacitor samples. As a result, the short-circuit failure ratio of the multi-layered ceramic capacitor samples was found to be 14%.

Working Example 4

An electrode layer was formed on a ceramic green sheet in the manner of Working Example 1 except that l-citronellol was used instead of dihydroterpinyl oxyethanol as the solvent for preparing the conductive paste for forming the electrode layer. Then, the surface roughness (Ra) of the electrode layer was measured. As a result, it was found that the surface roughness (Ra) of the electrode layer was 0.065 μm.

Further, the surface of the electrode layer was observed at four-hundred magnifications using a metallographic microscope. As a result, it was found that the surface of the electrode layer was free of cracks and wrinkles.

Furthermore, fifty multi-layered ceramic capacitor samples were fabricated in the manner of Working Example 1 and the resistance value of each of the thus fabricated multi-layered ceramic capacitor samples was measured using a multi-meter to determine the short-circuit failure ratio of the multi-layered ceramic capacitor samples. As a result, the short-circuit failure ratio of the multi-layered ceramic capacitor samples was found to be 12%.

Working Example 5

An electrode layer was formed on a ceramic green sheet in the manner of Working Example 1 except that l-perillylalcohol was used instead of dihydroterpinyl oxyethanol as the solvent for preparing the conductive paste for forming the electrode layer. Then, the surface roughness (Ra) of the electrode layer was measured. As a result, it was found that the surface roughness (Ra) of the electrode layer was 0.070 μm.

Further, the surface of the electrode layer was observed at four-hundred magnifications using a metallographic microscope. As a result, it was found that the surface of the electrode layer was free of cracks and wrinkles.

Furthermore, fifty multi-layered ceramic capacitor samples were fabricated in the manner of Working Example 1 and the resistance value of each of the thus fabricated multi-layered ceramic capacitor samples was measured using a multi-meter to determine the short-circuit failure ratio of the multi-layered ceramic capacitor samples. As a result, the short-circuit failure ratio of the multi-layered ceramic capacitor samples was found to be 10%.

Working Example 6

An electrode layer was formed on a ceramic green sheet in the manner of Working Example 1 except that acetoxy-methoxyethoxy-cyclohexanol acetate was used instead of dihydroterpinyl oxyethanol as the solvent for preparing the conductive paste for forming the electrode layer. Then, the surface roughness (Ra) of the electrode layer was measured. As a result, it was found that the surface roughness (Ra) of the electrode layer was 0.071 μm.

Further, the surface of the electrode layer was observed at four-hundred magnifications using a metallographic microscope. As a result, it was found that the surface of the electrode layer was free of cracks and wrinkles.

Furthermore, fifty multi-layered ceramic capacitor samples were fabricated in the manner of Working Example 1 and resistance value of each of the thus fabricated multi-layered ceramic capacitor samples was measured using a multi-meter to determine the short-circuit failure ratio of the multi-layered ceramic capacitor samples. As a result, the short-circuit failure ratio of the multi-layered ceramic capacitor samples was found to be 18%.

Comparative Example 1

An electrode layer was formed on a ceramic green sheet in the manner of Working Example 1 except that a mixed solvent of terpineol and kerosene (mixture ratio (mass ratio) of 50:50) was used instead of dihydroterpinyl oxyethanol as the solvent for preparing the conductive paste for forming the electrode layer. Then, the surface roughness (Ra) of the electrode layer was measured. As a result, it was found that the surface roughness (Ra) of the electrode layer was 0.101 μm.

Further, the surface of the electrode layer was observed at four-hundred magnifications using a metallographic microscope. As a result, cracks and wrinkles were observed on the surface of the electrode layer.

Furthermore, fifty multi-layered ceramic capacitor samples were fabricated in the manner of Working Example 1 and the resistance value of each of the thus fabricated multi-layered ceramic capacitor samples was measured using a multi-meter to determine the short-circuit failure ratio of the multi-layered ceramic capacitor samples. As a result, the short-circuit failure ratio of the multi-layered ceramic capacitor samples was found to be 76%.

Comparative Example 2

An electrode layer was formed on a ceramic green sheet in the manner of Working Example 1 except that dihydroterpineol was used instead of dihydroterpinyl oxyethanol as the solvent for preparing the conductive paste for forming the electrode layer. Then, the surface roughness (Ra) of the electrode layer was measured. As a result, it was found that the surface roughness (Ra) of the electrode layer was 0.087 μm.

Further, the surface of the electrode layer was observed at four-hundred magnifications using a metallographic microscope. As a result, cracks and wrinkles were observed on the surface of the electrode layer.

Furthermore, fifty multi-layered ceramic capacitor samples were fabricated in the manner of Working Example 1 and the resistance value of each of the thus fabricated multi-layered ceramic capacitor samples was measured using a multi-meter to determine the short-circuit failure ratio of the multi-layered ceramic capacitor samples. As a result, the short-circuit failure ratio of the multi-layered ceramic capacitor samples was found to be 44%.

Comparative Example 3

An electrode layer was formed on a ceramic green sheet in the manner of Working Example 1 except that terpineol was used instead of dihydroterpinyl oxyethanol as the solvent for preparing the conductive paste for forming the electrode layer. The surface roughness (Ra) of the electrode layer was measured and found to be 0.121 μm.

Further, the surface of the electrode layer was observed at four-hundred magnifications using a metallographic microscope. As a result, cracks and wrinkles were observed on the surface of the electrode layer.

Furthermore, fifty multi-layered ceramic capacitor samples were fabricated in the manner of Working Example 1 and the resistance value of each of the thus fabricated multi-layered ceramic capacitor samples was measured using a multi-meter to determine the short-circuit failure ratio of the multi-layered ceramic capacitor samples. As a result, the short-circuit failure ratio of the multi-layered ceramic capacitor samples was found to be 96%.

It was found from Working Examples 1 to 6 and Comparative Examples 1 to 3 that in the case where the conductive paste containing polyvinyl butyral whose degree of polymerization was 2400, degree of butyralization was 69 mol % and degree of acetalization was 12% as a binder and the mixed solvent of terpineol and kerosene (mixture ratio (mass ratio) of 50:50) as a solvent was printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby forming the electrode layer, in the case where the conductive paste containing polyvinyl butyral whose degree of polymerization was 2400, degree of butyralization was 69 mol % and degree of acetalization was 12% as a binder and dihydroterpineol as a solvent was printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby forming the electrode layer, and in the case where the conductive paste containing polyvinyl butyral whose degree of polymerization was 2400, degree of butyralization was 69 mol % and degree of acetalization was 12% as a binder and terpineol as a solvent was printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby forming the electrode layer, the surface roughness (Ra) of the electrode layer was increased and there arose a high risk of generating voids in the multi-layered ceramic capacitor fabricated by laminating the multi-layered units, while in the case where the conductive paste containing polyvinyl butyral whose degree of polymerization was 2400, degree of butyralization was 69 mol % and degree of acetalization was 12% as a binder and dihydroterpinyl oxyethanol as a solvent was printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby forming the electrode layer, in the case where the conductive paste containing polyvinyl butyral whose degree of polymerization was 2400, degree of butyralization was 69 mol % and degree of acetalization was 12% as a binder and terpinyl oxyethanol as a solvent was printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby forming the electrode layer, in the case where the conductive paste containing polyvinyl butyral whose degree of polymerization was 2400, degree of butyralization was 69 mol % and degree of acetalization was 12% as a binder and d-dihydrocarveol as a solvent was printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby forming the electrode layer, in the case where the conductive paste containing polyvinyl butyral whose degree of polymerization was 2400, degree of butyralization was 69 mol % and degree of acetalization was 12% as a binder and 1-citronellol as a solvent was printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby forming the electrode layer, in the case where the conductive paste containing polyvinyl butyral whose degree of polymerization was 2400, degree of butyralization was 69 mol % and degree of acetalization was 12% as a binder and l-perillylalcohol as a solvent was printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby forming the electrode layer, and in the case where the conductive paste containing polyvinyl butyral whose degree of polymerization was 2400, degree of butyralization was 69 mol % and degree of acetalization was 12% as a binder and acetoxy-methoxyethoxy-cyclohexanol acetate as a solvent was printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby forming the electrode layer, the surface roughness (Ra) of the electrode layer could be improved.

Further, it was found from Working Examples 1 to 6 and Comparative Examples 1 to 3 that in the case where the conductive paste containing polyvinyl butyral whose degree of polymerization was 2400, degree of butyralization was 69 mol % and degree of acetalization was 12% as a binder and the mixed solvent of terpineol and kerosene (mixture ratio (mass ratio) of 50:50) as a solvent was printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby fabricating the multi-layered unit, and the fifty multi-layered units were laminated, thereby fabricating the multi-layered ceramic capacitor, in the case where the conductive paste containing polyvinyl butyral whose degree of polymerization was 2400, degree of butyralization was 69 mol % and degree of acetalization was 12% as a binder and dihydroterpineol as a solvent was printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby fabricating the multi-layered unit, and the fifty multi-layered units were laminated, thereby fabricating the multi-layered ceramic capacitor, and in the case where the conductive paste containing polyvinyl butyral whose degree of polymerization was 2400, degree of butyralization was 69 mol % and degree of acetalization was 12% as a binder and terpineol as a solvent was printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby fabricating the multi-layered unit, and the fifty multi-layered units were laminated, thereby fabricating the multi-layered ceramic capacitor, the short-circuit failure ratio of the multi-layered ceramic capacitors were extremely high, while in the case where the conductive paste containing polyvinyl butyral whose degree of polymerization was 2400, degree of butyralization was 69 mol % and degree of acetalization was 12% as a binder and dihydroterpinyl oxyethanol as a solvent was printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby fabricating the multi-layered unit, and the fifty multi-layered units were laminated, thereby fabricating the multi-layered ceramic capacitor, in the case where the conductive paste containing polyvinyl butyral whose degree of polymerization was 2400, degree of butyralization was 69 mol % and degree of acetalization was 12% as a binder and terpinyl oxyethanol as a solvent was printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby fabricating the multi-layered unit, and the fifty multi-layered units were laminated, thereby fabricating the multi-layered ceramic capacitor, in the case where the conductive paste containing polyvinyl butyral whose degree of polymerization was 2400, degree of butyralization was 69 mol % and degree of acetalization was 12% as a binder and d-dihydrocarveol as a solvent was printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby fabricating the multi-layered unit, and the fifty multi-layered units were laminated, thereby fabricating the multi-layered ceramic capacitor, in the case where the conductive paste containing polyvinyl butyral whose degree of polymerization was 2400, degree of butyralization was 69 mol % and degree of acetalization was 12% as a binder and I-citronellol as a solvent was printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby fabricating the multi-layered unit, and the fifty multi-layered units were laminated, thereby fabricating the multi-layered ceramic capacitor, in the case where the conductive paste containing polyvinyl butyral whose degree of polymerization was 2400, degree of butyralization was 69 mol % and degree of acetalization was 12% as a binder and I-perillylalcohol as a solvent was printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby fabricating the multi-layered unit, and the fifty multi-layered units were laminated, thereby fabricating the multi-layered ceramic capacitor, and in the case where the conductive paste containing polyvinyl butyral whose degree of polymerization was 2400, degree of butyralization was 69 mol % and degree of acetalization was 12% as a binder and acetoxy-methoxyethoxy-cyclohexanol acetate as a solvent was printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby fabricating the multi-layered unit, and the fifty multi-layered units were laminated, thereby fabricating the multi-layered ceramic capacitor, it was found that the short-circuit failure ratio could be markedly decreased.

It is reasonable to assume that this was because the mixed solvent of terpineol and kerosene (mixture ratio (mass ratio) of 50:50), dihydroterpineol and terpineol used as the solvent of the conductive paste in Comparative Examples 1 to 3 dissolved the copolymer of methyl methacrylate and butyl acrylate contained in the dielectric paste used for forming the ceramic green sheet and, therefore, the cracks and wrinkles were generated on the surface of the electrode layer, thereby increasing the surface roughness (Ra) of the electrode layer and the pinholes and cracks were generated in the ceramic green sheet, while the dihydroterpinyl oxyethanol, terpinyl oxyethanol, d-dihydrocarveol, I-citronellol, I-perillylalcohol and acetoxy-methoxyethoxy-cyclohexanol acetate used as the solvent of the conductive paste in Working Examples 1 to 6 hardly dissolved the copolymer of methyl methacrylate and butyl acrylate contained in the dielectric paste used for forming the ceramic green sheet and it was therefore possible to effectively prevent generation of cracks and wrinkles on the surface of the electrode layer and prevent generation of pinholes and cracks in the ceramic green sheet.

Working Example 7

Preparation of a Dielectric Paste for Forming a Ceramic Green Sheet

A dielectric paste for forming a ceramic green sheet was prepared in the manner of Working Example 1.

Formation of a Ceramic Green Sheet

A polyethylene terephthalate film was coated with the thus prepared dielectric paste in the manner of Working Example 1 and a ceramic green sheet having a thickness of 1 μm was formed.

Preparation of a Dielectric Paste for Forming a Spacer Layer 1.48 weight parts of $(BaCa)SiO_3$, 1.01 weight parts of $Y_2O_3$, 0.72 weight part of $MgCO_3$, 0.13 weight part of MnO and 0.045 weight part of $V_2O_5$ were mixed, thereby preparing an additive powder.

150 weight parts of acetone, 104.3 weight parts of dihydroterpinyl oxyethanol and 1.5 weight parts of polyethylene glycol system dispersing agent were added to 100 weight parts of the thus prepared additive powder to prepare a slurry and the additives contained in the slurry were pulverized using a pulverizer "LMZ0.6" (Product name) manufactured by Ashizawa Finetech Co., Ltd.

When the additives contained in the slurry were to be pulverized, $ZrO_2$ beads having a diameter of 0.1 mm were charged into a vessel so as to occupy 80 volume % of the vessel, a rotor was rotated at the circumferential velocity of 14 m/min and the slurry was circulated between the vessel and a slurry tank until the holding time of the whole slurry became 5 minutes, thereby pulverizing the additives contained in the slurry.

The median diameter of the additives after pulverization was 0.1 μm.

Then, acetone was evaporated using an evaporator and removed from the slurry, thereby preparing an additive paste in which the additives were dispersed in dihydroterpinyl oxyethanol. The concentration of the additives contained in the additive paste was 49.3 weight %.

Further, 8 weight parts of polyvinyl butyral whose degree of polymerization was 2400, degree of butyralization was 69 mol % and degree of acetalization was 12% was dissolved into 92 weight parts of dihydroterpinyl oxyethanol at 70° C., thereby preparing an 8% organic vehicle solution. Further, a slurry having the composition set out below was dispersed in the organic vehicle solution for sixteen hours using a ball mill having an inner volume of 500 cc. The dispersing conditions were set so that the amount of charged $ZrO_2$ having a diameter of 2.0 mm was 30 volume % of the ball mill, the amount of the slurry in the ball mill was 60 volume % and the circumferential velocity of the ball mill was 45 m/min.

| | |
|---|---|
| additive paste | 8.87 weight parts |
| BaTiO$_3$ powder ("BT-02" (Product Name) manufactured by SAKAI CHEMICAL INDUSTRY CO., LTD.: particle diameter 0.2 μm) | 95.70 weight parts |
| organic vehicle | 104.36 weight parts |
| polyethylene glycol system dispersing agent | 1.19 weight parts |
| dioctyl phthalate (plasticizing agent) | 2.61 weight parts |
| imidazoline system surfactant | 0.4 weight parts |
| acetone | 57.20 weight parts |

Then, acetone was evaporated using a stirring device having an evaporator and a heating mechanism and removed from the slurry, thereby preparing a dielectric paste.

Preparation of a Conductive Paste for Forming an Electrode Layer

A conductive paste for forming an electrode layer was prepared in the manner of Working Example 1.

Formation of a Spacer Layer

The thus prepared dielectric paste was printed on the surface of the ceramic green sheet in a predetermined pattern using a screen printing machine and dried at 90° C. for five minutes, thereby forming a spacer layer on the surface of the ceramic green sheet.

The surface roughness (Ra) of the thus formed spacer layer was measured using the "SURFCORDER (SE-30D)" (Product Name) manufactured by Kosaka Laboratory Ltd in the manner of Working Example 1. As a result, it was found that the surface roughness (Ra) of the electrode layer was 0.062 μm.

Further, the surface of the spacer layer was observed at four-hundred magnifications using a metallographic microscope. As a result, it was found that the surface of the spacer layer was free of cracks and wrinkles.

Formation of an Electrode Layer and Fabrication of a Multi-layered Unit

Furthermore, the conductive paste was printed on the surface of the ceramic green sheet in a complimentary pattern to that of the spacer layer using a screen printing machine and dried at 90° C. for five minutes, forming an electrode layer having a thickness of 1 μm. Thus, a multi-layered unit including the ceramic green sheet, the electrode layer and the spacer layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd in the manner of Working Example 1. As a result, it was found that the surface roughness (Ra) of the electrode layer was 0.062 μm.

Further, the surface of the spacer layer was observed at four-hundred magnifications using a metallographic microscope. As a result, it was found that the surface of the spacer layer was free of cracks and wrinkles.

Fabrication of a Ceramic Green Chip

The surface of a polyethylene terephthalate film was coated with the dielectric paste in the manner of Working Example 1 and a ceramic green sheet having a thickness of 10 μm was formed.

The thus formed ceramic green sheet was peeled off from the polyethylene terephthalate film and diced. Five of the diced ceramic green sheet units were laminated to form a cover layer having a thickness of 50 μm. Further, the multi-layered unit was peeled off from the polyethylene terephthalate film and diced and fifty of the diced multi-layered units were laminated on the cover layer.

Then, the ceramic green sheet having a thickness of 10 μm was peeled off from the polyethylene terephthalate film and diced and five of the ceramic green sheet units were laminated on the multi-layered units laminated on the cover layer, thereby fabricating a laminated body including the lower cover layer having a thickness of 50 μm, an active layer having a thickness of 100 μm and including the laminated fifty multi-layered units each including the ceramic green sheet having a thickness of 1 μm, the electrode layer having a thickness of 1 μm and the spacer layer having a thickness of 1 μm, and an upper cover layer having a thickness of 50 μm.

Further, a pressure of 100 MPa was applied onto the thus fabricated laminated body at 70° C., thereby press molding the laminated body and the laminated body was diced to predetermined dimensions using a dicing machine, thereby fabricating ceramic green chips.

Fabrication of a Multi-layered Ceramic Capacitor Sample

A multi-layered ceramic capacitor sample was fabricated using the thus fabricated ceramic green chips in the manner of Working Example 1.

Fifty multi-layered ceramic capacitor samples were fabricated in total in the manner of Working Example 1.

Measurement of Short-circuit Failure Ratio

In the manner of Working Example 1, the resistance value of each of the thus fabricated multi-layered ceramic capacitor samples was measured using a multi-meter to determine the short-circuit failure ratio.

As a result, the short-circuit failure ratio of the multi-layered ceramic capacitor samples was found to be 6%.

Working Example 8

A spacer layer and an electrode layer were formed on a ceramic green sheet in the manner of Working Example 7 except that terpinyl oxyethanol was used instead of dihydroterpinyl oxyethanol as the solvent for preparing the conductive paste for forming the electrode layer and the dielectric paste for forming the spacer layer. Then, the surface roughness (Ra) of the electrode layer and the surface roughness (Ra) of the spacer layer were measured. As a result, it was found that the surface roughness (Ra) of the electrode layer and the surface roughness (Ra) of the spacer layer were 0.066 μm and 0.066 μm, respectively.

Further, the surface of the electrode layer and the surface of the spacer layer were observed at four-hundred magnifications using a metallographic microscope. As a result, it was found that the surface of the electrode layer and the surface of the spacer layer were free of cracks and wrinkles.

Furthermore, fifty multi-layered ceramic capacitor samples were fabricated in the manner of Working Example 7 and the resistance value of each of the thus fabricated multi-layered ceramic capacitor samples was measured using a multi-meter to determine the short-circuit failure ratio of the multi-layered ceramic capacitor samples. As a result, the short-circuit failure ratio of the multi-layered ceramic capacitor samples was found to be 10%.

Working Example 9

A spacer layer and an electrode layer were formed on a ceramic green sheet in the manner of Working Example 7 except that d-dihydrocarveol was used instead of dihydroterpinyl oxyethanol as the solvent for preparing the conductive paste for forming the electrode layer and the dielectric paste for forming the spacer layer. Then, the surface roughness (Ra) of the electrode layer and the surface roughness (Ra) of the spacer layer were measured. As a result, it was found that the surface roughness (Ra) of the electrode layer and the surface roughness (Ra) of the spacer layer were 0.069 µm and 0.069 µm, respectively.

Further, the surface of the electrode layer and the surface of the spacer layer were observed at four-hundred magnifications using a metallographic microscope. As a result, it was found that the surface of the electrode layer and the surface of the spacer layer were free of cracks and wrinkles.

Furthermore, fifty multi-layered ceramic capacitor samples were fabricated in the manner of Working Example 7 and the resistance value of each of the thus fabricated multi-layered ceramic capacitor samples was measured using a multi-meter to determine the short-circuit failure ratio of the multi-layered ceramic capacitor samples. As a result, the short-circuit failure ratio of the multi-layered ceramic capacitor samples was found to be 14%.

Working Example 10

A spacer layer and an electrode layer were formed on a ceramic green sheet in the manner of Working Example 7 except that 1-citronellol was used instead of dihydroterpinyl oxyethanol as the solvent for preparing the conductive paste for forming the electrode layer and a dielectric paste for forming the spacer layer. Then, the surface roughness (Ra) of the electrode layer and the surface roughness (Ra) of the spacer layer were measured. As a result, it was found that the surface roughness (Ra) of the electrode layer and the surface roughness (Ra) of the spacer layer were 0.065 µm and 0.065 µm, respectively.

Further, the surface of the electrode layer and the surface of the spacer layer were observed at four-hundred magnifications using a metallographic microscope. As a result, it was found that the surface of the electrode layer and the surface of the spacer layer were free of cracks and wrinkles.

Furthermore, fifty multi-layered ceramic capacitor samples were fabricated in the manner of Working Example 7 and the resistance value of each of the thus fabricated multi-layered ceramic capacitor samples was measured using a multi-meter to determine the short-circuit failure ratio of the multi-layered ceramic capacitor samples. As a result, the short-circuit failure ratio of the multi-layered ceramic capacitor samples was found to be 12%.

Working Example 11

A spacer layer and an electrode layer were formed on a ceramic green sheet in the manner of Working Example 7 except that I-perillylalcohol was used instead of dihydroterpinyl oxyethanol as the solvent for preparing the conductive paste for forming the electrode layer and the dielectric paste for forming the spacer layer. Then, the surface roughness (Ra) of the electrode layer and the surface roughness (Ra) of the spacer layer were measured. As a result, it was found that the surface roughness (Ra) of the electrode layer and the surface roughness (Ra) of the spacer layer were 0.070 µm and 0.070 µm, respectively.

Further, the surface of the electrode layer and the surface of the spacer layer were observed at four-hundred magnifications using a metallographic microscope. As a result, it was found that the surface of the electrode layer and the surface of the spacer layer were free of cracks and wrinkles.

Furthermore, fifty multi-layered ceramic capacitor samples were fabricated in the manner of Working Example 7 and the resistance value of each of the thus fabricated multi-layered ceramic capacitor samples was measured using a multi-meter to determine the short-circuit failure ratio of the multi-layered ceramic capacitor samples. As a result, the short-circuit failure ratio of the multi-layered ceramic capacitor samples was found to be 10%.

Working Example 12

A spacer layer and an electrode layer were formed on a ceramic green sheet in the manner of Working Example 7 except that acetoxy-methoxyethoxy-cyclohexanol acetate was used instead of dihydroterpinyl oxyethanol as the solvent for preparing the conductive paste for forming the electrode layer and the dielectric paste for forming the spacer layer. Then, the surface roughness (Ra) of the electrode layer and the surface roughness (Ra) of the spacer layer were measured. As a result, it was found that the surface roughness (Ra) of the electrode layer and the surface roughness (Ra) of the spacer layer were 0.071 µm and 0.071 µm, respectively.

Further, the surface of the electrode layer and the surface of the spacer layer were observed at four-hundred magnifications using a metallographic microscope. As a result, it was found that the surface of the electrode layer and the surface of the spacer layer were free of cracks and wrinkles.

Furthermore, fifty multi-layered ceramic capacitor samples were fabricated in the manner of Working Example 7 and the resistance value of each of the thus fabricated multi-layered ceramic capacitor samples was measured using a multi-meter to determine the short-circuit failure ratio of the multi-layered ceramic capacitor samples. As a result, the short-circuit failure ratio of the multi-layered ceramic capacitor samples was found to be 18%.

Comparative Example 4

A spacer layer and an electrode layer were formed on a ceramic green sheet in the manner of Working Example 7 except that a mixed solvent of terpineol and kerosene (mixture ratio (mass ratio) of 50:50) was used instead of dihydroterpinyl oxyethanol as the solvent for preparing the conductive paste for forming the electrode layer and the dielectric paste for forming the spacer layer. Then, the surface roughness (Ra) of the electrode layer and the surface roughness (Ra) of the spacer layer were measured. As a result, it was found that the surface roughness (Ra) of the electrode layer and the surface roughness (Ra) of the spacer layer were 0.101 µm and 0.101 µm, respectively.

Further, the surface of the electrode layer and the surface of the spacer layer were observed at four hundred magnifications using a metallographic microscope. As a result, cracks and wrinkles were observed on the surface of the electrode layer and the surface of the spacer layer.

Furthermore, fifty multi-layered ceramic capacitor samples were fabricated in the manner of Working Example 7 and the resistance value of each of the thus fabricated multi-layered ceramic capacitor samples was measured using a multi-meter to determine the short-circuit failure ratio of the multi-layered ceramic capacitor samples. As a result, the short-circuit failure ratio of the multi-layered ceramic capacitor samples was found to be 76%.

Comparative Example 5

A spacer layer and an electrode layer were formed on a ceramic green sheet in the manner of Working Example 7 except that dihydroterpineol was used instead of dihydroterpinyl oxyethanol as the solvent for preparing the conductive paste for forming the electrode layer and the dielectric paste for forming the spacer layer. Then, the surface roughness (Ra) of the electrode layer and the surface roughness (Ra) of the spacer layer were measured. As a result, it was found that the surface roughness (Ra) of the electrode layer and the surface roughness (Ra) of the spacer layer were 0.121 μm and 0.121 μm, respectively.

Further, the surface of the electrode layer and the surface of the spacer layer were observed at four-hundred magnifications using a metallographic microscope. As a result, cracks and wrinkles were observed on the surface of the electrode layer and the surface of the spacer layer.

Furthermore, fifty multi-layered ceramic capacitor samples were fabricated in the manner of Working Example 7 and the resistance value of each of the thus fabricated multi-layered ceramic capacitor samples was measured using a multi-meter to determine the short-circuit failure ratio of the multi-layered ceramic capacitor samples. As a result, the short-circuit failure ratio of the multi-layered ceramic capacitor samples was found to be 96%.

It was found from Working Examples 7 to 12 and Comparative Examples 4 to 6 that in the case where the dielectric paste containing polyvinyl butyral whose degree of polymerization was 2400, degree of butyralization was 69 mol % and degree of acetalization was 12% as a binder and the mixed solvent of terpineol and kerosene (mixture ratio (mass ratio) of 50:50) as a solvent was printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby forming the spacer layer, and the conductive paste containing polyvinyl butyral whose degree of polymerization was 2400, degree of butyralization was 69 mol % and degree of acetalization was 12% as a binder and the mixed solvent of terpineol and kerosene (mixture ratio (mass ratio) of 50:50) as a solvent was printed on the surface of the ceramic green sheet, thereby forming the electrode layer, in the case where the dielectric paste containing polyvinyl butyral whose degree of polymerization was 2400, degree of butyralization was 69 mol % and degree of acetalization was 12% as a binder and dihydroterpineol as a solvent was printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby forming the spacer layer, and the conductive paste containing polyvinyl butyral whose degree of polymerization was 2400, degree of butyralization was 69 mol % and degree of acetalization was 12% as a binder and dihydroterpineol as a solvent was printed on the surface of the ceramic green sheet, thereby forming the electrode layer, and in the case where the dielectric paste containing polyvinyl butyral whose degree of polymerization was 2400, degree of butyralization was 69 mol % and degree of acetalization was 12% as a binder and terpineol as a solvent was printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby forming the spacer layer, and the conductive paste containing polyvinyl butyral whose degree of polymerization was 2400, degree of butyralization was 69 mol % and degree of acetalization was 12% as a binder and terpineol as a solvent was printed on the surface of the ceramic green sheet, thereby forming the electrode layer, the surface roughness (Ra) of the spacer layer and the surface roughness (Ra) of the electrode layer were degraded and there arose a high risk of generating voids in the multi-layered ceramic capacitor fabricated by laminating the multi-layered units, while in the case where the dielectric paste containing polyvinyl butyral whose degree of polymerization was 2400, degree of butyralization was 69 mol % and degree of acetalization was 12% as a binder and dihydroterpinyl oxyethanol as a solvent was printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby forming the spacer layer, and the conductive paste containing polyvinyl butyral whose degree of polymerization was 2400, degree of butyralization was 69 mol % and degree of acetalization was 12% as a binder and dihydroterpinyl oxyethanol as a solvent was printed on the surface of the ceramic green sheet, thereby forming the electrode layer, in the case where the dielectric paste containing polyvinyl butyral whose degree of polymerization was 2400, degree of butyralization was 69 mol % and degree of acetalization was 12% as a binder and terpinyl oxyethanol as a solvent was printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby forming the spacer layer, and the conductive paste containing polyvinyl butyral whose degree of polymerization was 2400, degree of butyralization was 69 mol % and degree of acetalization was 12% as a binder and terpinyl oxyethanol as a solvent was printed on the surface of the ceramic green sheet, thereby forming the electrode layer, in the case where the dielectric paste containing polyvinyl butyral whose degree of polymerization was 2400, degree of butyralization was 69 mol % and degree of acetalization was 12% as a binder and d-dihydrocarveol as a solvent was printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby forming the spacer layer, and the conductive paste containing polyvinyl butyral whose degree of polymerization was 2400, degree of butyralization was 69 mol % and degree of acetalization was 12% as a binder and d-dihydrocarveol as a solvent was printed on the surface of the ceramic green sheet, thereby forming the electrode layer, in the case where the dielectric paste containing polyvinyl butyral whose degree of polymerization was 2400, degree of butyralization was 69 mol % and degree of acetalization was 12% as a binder and I-citronellol as a solvent was printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby forming the spacer layer, and the conductive paste containing polyvinyl butyral whose degree of polymerization was 2400, degree of butyralization was 69 mol % and degree of acetalization was 12% as a binder and 1-citronellol as a solvent was printed on the surface of the ceramic green sheet, thereby forming the electrode layer, in the case where the dielectric paste containing polyvinyl butyral whose degree of polymerization was 2400, degree of butyralization was 69 mol % and degree of acetalization was 12% as a binder and I-perillylalcohol as a solvent was printed on the surface of the ceramic green sheet formed by using the dielectric paste containing copolymer of methyl methacrylate and butyl acrylate whose acid value was 5 mgKOH/gram and copolymerization ratio (weight ratio)

was 82:18 as a binder, thereby forming the spacer layer, and the conductive paste containing polyvinyl butyral whose degree of polymerization was 2400, degree of butyralization was 69 mol % and degree of acetalization was 12% as a binder and I-perillylalcohol as a solvent was printed on the surface of the ceramic green sheet, thereby forming the electrode layer, and in the case where the dielectric paste containing polyvinyl butyral whose degree of polymerization was 2400, degree of butyralization was 69 mol % and degree of acetalization was 12% as a binder and acetoxy-methoxyethoxy-cyclohexanol acetate as a solvent was printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby forming the spacer layer, and the conductive paste containing polyvinyl butyral whose degree of polymerization was 2400, degree of butyralization was 69 mol % and degree of acetalization was 12% as a binder and acetoxy-methoxyethoxy-cyclohexanol acetate as a solvent was printed on the surface of the ceramic green sheet, thereby forming the electrode layer, it was found that the surface roughness (Ra) of the spacer layer and the surface roughness (Ra) of the electrode layer could be improved.

Further, it was found from Working Examples 7 to 12 and Comparative Examples 4 to 6 that in the case where the dielectric paste and the conductive paste each containing polyvinyl butyral whose degree of polymerization was 2400, degree of butyralization was 69 mol % and degree of acetalization was 12% as a binder and the mixed solvent of terpineol and kerosene (mixture ratio (mass ratio) of 50:50) as a solvent were printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby fabricating the multi-layered unit, and the fifty multi-layered units were laminated, thereby fabricating the multi-layered ceramic capacitor, in the case where the dielectric paste and the conductive paste each containing polyvinyl butyral whose degree of polymerization was 2400, degree of butyralization was 69 mol % and degree of acetalization was 12% as a binder and dihydroterpineol as a solvent were printed on the surface of the ceramic green sheet formed by using the dielectric paste containing copolymer of methyl methacrylate and butyl acrylate whose acid value was 5 mgKOH/gram copolymerization ratio (weight ratio) was 82:18 as a binder, thereby fabricating the multi-layered unit, and the fifty multi-layered units were laminated, thereby fabricating the multi-layered ceramic capacitor, and in the case where the dielectric paste and the conductive paste each containing polyvinyl butyral whose degree of polymerization was 2400, degree of butyralization was 69 mol % and degree of acetalization was 12% as a binder and terpineol as a solvent were printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby fabricating the multi-layered unit, and the fifty multi-layered units were laminated, thereby fabricating the multi-layered ceramic capacitor, the short-circuit failure ratio of the multi-layered ceramic capacitors were extremely high, while in the case where the dielectric paste and the conductive paste each containing polyvinyl butyral whose degree of polymerization was 2400, degree of butyralization was 69 mol % and degree of acetalization was 12% as a binder and dihydroterpinyl oxyethanol as a solvent were printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby fabricating the multi-layered unit, and the fifty multi-layered units were laminated, thereby fabricating the multi-layered ceramic capacitor, in the case where the dielectric paste and the conductive paste each containing polyvinyl butyral whose degree of polymerization was 2400, degree of butyralization was 69 mol % and degree of acetalization was 12% as a binder and terpinyl oxyethanol as a solvent were printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby fabricating the multi-layered unit and the fifty multi-layered units were laminated, thereby fabricating, the multi-layered ceramic capacitor, in the case where the dielectric paste and the conductive paste each containing polyvinyl butyral whose degree of polymerization was 2400, degree of butyralization was 69 mol % and degree of acetalization was 12% as a binder and d-dihydrocarveol as a solvent were printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby fabricating the multi-layered unit, and the fifty multi-layered units were laminated, thereby fabricating the multi-layered ceramic capacitor, in the case where the dielectric paste and the conductive paste each containing polyvinyl butyral whose degree of polymerization was 2400, degree of butyralization was 69 mol % and degree of acetalization was 12% as a binder and 1-citronellol as a solvent were printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby fabricating the multi-layered unit, and the fifty multi-layered units were laminated, thereby fabricating the multi-layered ceramic capacitor, in the case where the dielectric paste and the conductive paste each containing polyvinyl butyral whose degree of polymerization was 2400, degree of butyralization was 69 mol % and degree of acetalization was 12% as a binder and I-perillylalcohol as a solvent were printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby fabricating the multi-layered unit, and the fifty multi-layered units were laminated, thereby fabricating the multi-layered ceramic capacitor, and in the case where the dielectric paste and the conductive paste each containing polyvinyl butyral whose degree of polymerization was 2400, degree of butyralization was 69 mol % and degree of acetalization was 12% as a binder and acetoxy-methoxyethoxy-cyclohexanol acetate as a solvent were printed on the surface of the ceramic green sheet formed by using the dielectric paste containing copolymer of methyl methacrylate and butyl acrylate whose acid value was 5 mgKOH/gram and copolymerization ratio (weight ratio) was 82:18 as a binder, thereby fabricating the multi-layered unit, and the fifty multi-layered units were laminated, thereby fabricating the multi-layered ceramic capacitor, it was found that the short-circuit failure ratio of the multi-layered ceramic capacitors could be markedly reduced.

It is reasonable to assume that this was because the mixed solvent of terpineol and kerosene (mixture ratio (mass ratio)

of 50:50), dihydroterpineol and terpineol used as the solvent of the dielectric paste for forming the spacer layer and the solvent of the conductive paste in Comparative Examples 4 to 6 dissolved the copolymer of methyl methacrylate and butyl acrylate contained in the dielectric paste used for forming the ceramic green sheet and, therefore, the cracks and wrinkles were generated on the surfaces of the spacer layer and the electrode layer, thereby degrading the surface roughness (Ra) of the spacer layer and the surface roughness (Ra) of the electrode layer and pinholes and cracks were generated in the ceramic green sheet, while the dihydroterpinyl oxyethanol, terpinyl oxyethanol, d-dihydrocarveol, I-citronellol, I-perillylalcohol and acetoxy-methoxyethoxy-cyclohexanol acetate used as the solvent of the dielectric paste for forming the spacer layer and a solvent of the conductive paste in Working Examples 7 to 12 hardly dissolved the copolymer of methyl methacrylate and butyl acrylate contained in the dielectric paste used for forming the ceramic green sheet and it was therefore possible to effectively prevent generation of cracks and wrinkles on the surfaces of the spacer layer and the electrode layer and prevent generation of pinholes and cracks in the ceramic green sheet.

The present invention has thus been shown and described with reference to the preferred embodiments and the working examples. However, it should be noted that the present invention is in no way limited to the details of the described arrangement but changes and modifications may be made without departing from the scope of the appended claims.

The invention claimed is:

1. A conductive paste comprising a butyral system resin as a binder and at least one solvent selected from a group consisting of dihydroterpinyl oxyethanol, terpinyl oxyethanol, d-dihydrocarveol, I-perillylalcohol and acetoxy-methoxyethoxy-cyclohexanol acetate as a solvent.

2. A conductive paste in accordance with claim 1, wherein the degree of polymerization of the butyral system resin is equal to or larger than 1400 and equal to or smaller than 2600.

3. A conductive paste in accordance with claim 2, wherein the degree of butyralization of the butyral system resin is equal to or larger than 64 mol % and equal to or smaller than 78 mol %.

4. A conductive paste in accordance with claim 1, wherein the degree of butyralization of the butyral system resin is equal to or larger than 64 mol % and equal to or smaller than 78 mol %.

5. A method for manufacturing a multi-layered unit for a multi-layered ceramic electronic component comprising a step of printing a conductive paste including a butyral system resin as a binder and at least one solvent selected from a group consisting of dihydroterpinyl oxyethanol, terpinyl oxyethanol, d-dihydrocarveol, I-perillylalcohol and acetoxy-methoxyethoxy-cyclohexanol acetate as a solvent on a ceramic green sheet including an acrylic system resin as a binder in a predetermined pattern to form an electrode layer.

6. A method for manufacturing a multi-layered unit for a multi-layered ceramic electronic component in accordance with claim 5, which further comprises a step of printing a dielectric paste including a butyral system resin as a binder and at least one solvent selected from a group consisting of dihydroterpinyl oxyethanol, terpinyl oxyethanol, d-dihydrocarveol, I-citronellol, I-perillylalcohol and acetoxy-methoxyethoxy-cyclohexanol acetate as a solvent on the ceramic green sheet in a complementary pattern to that of the electrode layer after drying the electrode layer, thereby forming a spacer layer.

7. A method for manufacturing a multi-layered unit for a multi-layered ceramic electronic component in accordance with claim 6, wherein the degree of polymerization of the butyral system resin is equal to or larger than 1400 and equal to or smaller than 2600.

8. A method for manufacturing a multi-layered unit for a multi-layered ceramic electronic component in accordance with claim 7, wherein the degree of butyralization of the butyral system resin is equal to or larger than 64 mol % and equal to or smaller than 78 mol %.

9. A method for manufacturing a multi-layered unit for a multi-layered ceramic electronic component in accordance with claim 6, wherein the degree of butyralization of the butyral system resin is equal to or larger than 64 mol % and equal to or smaller than 78 mol %.

10. A method for manufacturing a multi-layered unit for a multi-layered ceramic electronic component in accordance with claim 5, which further comprises a step of printing a dielectric paste including a butyral system resin as a binder and at least one solvent selected from a group consisting of dihydroterpinyl oxyethanol, terpinyl oxyethanol, d-dihydrocarveol, I-citronellol, I-perillylalcohol and acetoxy-methoxyethoxy-cyclohexanol acetate as a solvent on the ceramic green sheet in a complementary pattern to that of the electrode layer prior to forming the electrode layer, thereby forming a spacer layer.

11. A method for manufacturing a multi-layered unit for a multi-layered ceramic electronic component in accordance with claim 10, wherein the degree of polymerization of the butyral system resin is equal to or larger than 1400 and equal to or smaller than 2600.

12. A method for manufacturing a multi-layered unit for a multi-layered ceramic electronic component in accordance with claim 11, wherein the degree of butyralization of the butyral system resin is equal to or larger than 64 mol % and equal to or smaller than 78 mol %.

13. A method for manufacturing a multi-layered unit for a multi-layered ceramic electronic component in accordance with claim 10, wherein the degree of butyralization of the butyral system resin is equal to or larger than 64 mol % and equal to or smaller than 78 mol %.

14. A method for manufacturing a multi-layered unit for a multi-layered ceramic electronic component in accordance with claim 5, wherein the degree of polymerization of the butyral system resin is equal to or larger than 1400 and equal to or smaller than 2600.

15. A method for manufacturing a multi-layered unit for a multi-layered ceramic electronic component in accordance with claim 14, wherein the degree of butyralization of the butyral system resin is equal to or larger than 64 mol % and equal to or smaller than 78 mol %.

16. A method for manufacturing a multi-layered unit for a multi-layered ceramic electronic component in accordance with claim 5, wherein the degree of butyralization of the butyral system resin is equal to or larger than 64 mol % and equal to or smaller than 78 mol %.

17. A method for manufacturing a multi-layered unit for a multi-layered ceramic electronic component in accordance with claim 5, wherein the weight-average molecular weight of the acrylic system resin is equal to or larger than 250,000 and equal to or smaller than 500,000.

18. A method for manufacturing a multi-layered unit for a multi-layered ceramic electronic component in accordance with claim 5, wherein the acid value of the acrylic system resin is equal to or larger than 5 mgKOH/gram and equal to or smaller than 10 mgKOH/gram.

* * * * *